(12) United States Patent
Orihara et al.

(10) Patent No.: US 9,252,488 B2
(45) Date of Patent: Feb. 2, 2016

(54) ANTENNA APPARATUS AND COMMUNICATION APPARATUS

(75) Inventors: Katsuhisa Orihara, Tochigi (JP); Yoshito Ikeda, Tochigi (JP); Norio Saito, Tochigi (JP); Satoru Sugita, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 258 days.

(21) Appl. No.: 14/008,216

(22) PCT Filed: Mar. 23, 2012

(86) PCT No.: PCT/JP2012/057614
§ 371 (c)(1),
(2), (4) Date: Sep. 27, 2013

(87) PCT Pub. No.: WO2012/133232
PCT Pub. Date: Oct. 4, 2012

(65) Prior Publication Data
US 2014/0104127 A1    Apr. 17, 2014

(30) Foreign Application Priority Data

Mar. 30, 2011 (JP) .................................. 2011-075494
Nov. 29, 2011 (JP) .................................. 2011-260630

(51) Int. Cl.
*H01Q 7/06* (2006.01)
*H01Q 1/24* (2006.01)
(Continued)

(52) U.S. Cl.
CPC .............. *H01Q 7/06* (2013.01); *G06K 7/10237* (2013.01); *H01Q 1/2208* (2013.01); *H01Q 1/243* (2013.01)

(58) Field of Classification Search
CPC ....... H01Q 1/243; H01Q 1/2208; H01Q 7/06; G06K 7/10237; G06K 19/07; G06K 19/077
USPC .................................................. 343/702, 788
See application file for complete search history.

(56) References Cited

U.S. PATENT DOCUMENTS

2007/0205291 A1   9/2007  Aramaki et al.
2008/0035741 A1   2/2008  Sakama
(Continued)

FOREIGN PATENT DOCUMENTS

GB        2469209 A       10/2010
JP     A 2000-68891        3/2000
(Continued)

OTHER PUBLICATIONS

Translation of Nov. 14, 2013 International Preliminary Report on Patentability issued in International Patent Application No. PCT/JP2012/057614.

(Continued)

*Primary Examiner* — Hoang V Nguyen
(74) *Attorney, Agent, or Firm* — Oliff PLC

(57) ABSTRACT

The present invention provides an antenna apparatus which can realize favorable communication properties while achieving downsizing of a casing of an electronic device when incorporated in an electronic device. An antenna module (1a) which is incorporated in a mobile phone (130) and which is enabled to perform communication by receiving a magnetic field transmitted from a reader/writer (120) comprises an antenna coil (11a) which is wound in a clearance (132) between an end portion (133b) of a metallic plate (133a) opposing the reader/writer (120) within a casing (131) of the mobile phone (130) and an inner peripheral wall (131a) of the casing (131) so as not to surround an outer peripheral portion of the metallic plate (133a) and which is inductively coupled with the reader/writer (120).

10 Claims, 17 Drawing Sheets

(51) Int. Cl.
*H01Q 1/22* (2006.01)
*G06K 7/10* (2006.01)

(56) References Cited

U.S. PATENT DOCUMENTS

2008/0036608 A1 2/2008 Sakama
2010/0309081 A1 12/2010 Kobayashi et al.
2012/0081257 A1* 4/2012 Yosui et al. .................. 343/788

FOREIGN PATENT DOCUMENTS

| JP | A 2001-28510 | 1/2001 |
|---|---|---|
| JP | A 2001-134151 | 5/2001 |
| JP | A 2001-266083 | 9/2001 |
| JP | A 2005-175667 | 6/2005 |
| JP | A 2005-303541 | 10/2005 |
| JP | A-2006-129003 | 5/2006 |
| JP | A 2008-40904 | 2/2008 |
| JP | A 2010-147912 | 7/2010 |
| JP | A 2010-245776 | 10/2010 |
| WO | WO 2009/078214 A1 | 6/2009 |

OTHER PUBLICATIONS

Jun. 19, 2012 Search Report issued in International Patent Application No. PCT/JP2012/057614 (with translation).
Aug. 21, 2014 Search Report issued in European Patent Application No. 12765091.9.

* cited by examiner

ANTENNA APPARATUS AND COMMUNICATION APPARATUS

FIELD OF THE INVENTION

This invention relates to an antenna apparatus and a communication apparatus which is incorporated in an electronic device and which is enabled to perform communication by receiving a magnetic field transmitted from a transmitter.

The present application asserts priority rights based on JP Patent Application 2011-075494 filed in Japan on Mar. 30, 2011 and based on JP Patent Application 2011-260630 filed in Japan on Nov. 29, 2011. The total contents of disclosure of the Patent Applications of the senior filing dates are to be incorporated by reference into the present application.

BACKGROUND OF THE INVENTION

Antenna modules for RFID (Radio Frequency Identification) are used in electronic devices such as mobile phones for installing functions of near field non-contact communication.

Such an antenna module performs communication by utilizing inductive coupling with an antenna coil installed in a transmitter such as a reader/writer. More particularly, when the antenna coil receives a magnetic field from the reader/writer, the antenna module converts the magnetic field into power so as to drive an IC that functions as a communication processing portion.

In order to reliably perform communication, the antenna module is required to receive a magnetic flux of a certain value or more from the reader/writer by using the antenna coil. Therefore, an antenna module according to the prior art is provided with a loop coil in a casing of a mobile phone so as to receive a magnetic flux from the reader/writer by using the coil.

For instance, Patent Document 1 suggests a method in which a flexible cable or a flat cable is disposed around a built-in battery as a method for improving properties of a loop antenna incorporated in a mobile phone apparatus.

PRIOR-ART DOCUMENTS

Patent Document

PTL 1: Japanese Patent Application Laid-Open No. 2005-303541

SUMMARY OF THE INVENTION

The invention as recited in the above Patent Document 1 involved the problem of large fluctuations in resonance frequencies since the antenna was disposed in a clearance within a casing which made it difficult to make the shape of the antenna constant which, in turn, resulted in large variations in inductance.

Particularly in case the antenna was formed by using a flexible cable, the invention as recited in the above Patent Document 1 involved the problem that a large number of manufacturing steps for adjusting the resonance frequency was required since it was difficult to adjust the distributed capacity between wirings.

The present invention has been made in view of such circumstances, and it is an object thereof to provide an antenna apparatus and a communication apparatus which is capable of realizing favorable communication properties while achieving downsizing of a casing of an electronic device when incorporated in an electronic device.

For solving the above-mentioned subjects, in the present invention, an antenna apparatus which is incorporated in an electronic device and which is enabled to perform communication by receiving a magnetic field transmitted from a transmitter comprises an antenna coil which is wound in a clearance between an end portion of a conductive body opposing the transmitter within a casing of the electronic device and an inner peripheral wall of the casing so as not to surround an outer peripheral portion of the conductive body and which is inductively coupled with the transmitter.

Moreover, in the present invention, a communication apparatus which is enabled to perform communication by receiving a magnetic field transmitted from a transmitter comprises an antenna coil which is wound in a clearance between an end portion of a conductive body opposing the transmitter within a casing of the electronic device and an inner peripheral wall of the casing so as not to surround an outer peripheral portion of the conductive body and which is inductively coupled with the transmitter, and a communication processing portion which is driven through current flowing through the antenna coil for performing communication with the transmitter.

Effects of Invention

In the present invention, since the antenna coil is wound in a clearance between an end portion of a conductive body opposing a transmitter within a casing of an electronic device and an inner peripheral wall of the casing so as not to surround an outer peripheral portion of the conductive body, it is possible to achieve downsizing of the casing of the electronic device when it is incorporated in the electronic device. Further, the present invention is capable of realizing favorable communication properties by utilizing magnetic properties of a conductive body opposing a transmitter.

DETAILED DESCRIPTION OF THE INVENTION

Figure 1:
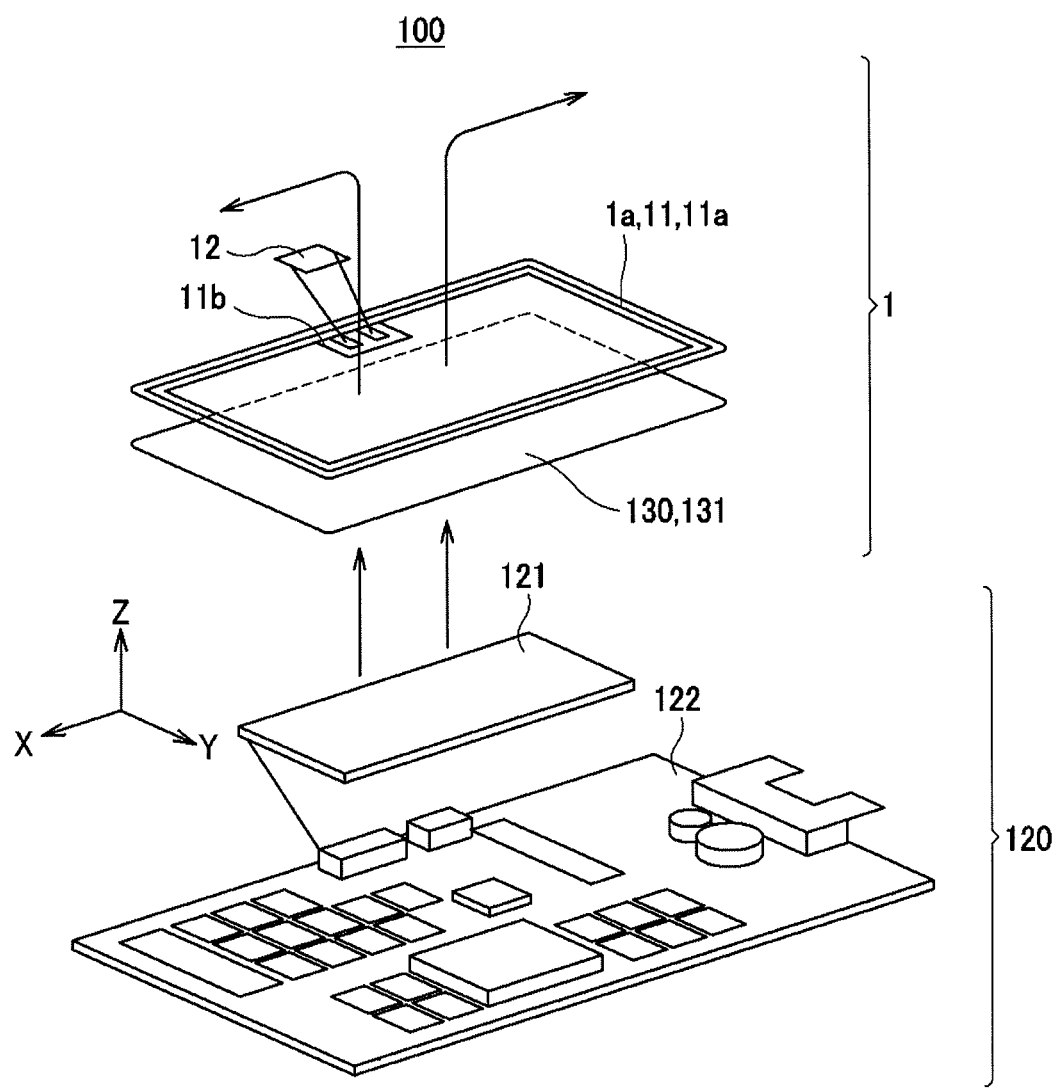
FIG. 1 is a view for explaining a structure of a radio communications system incorporating an antenna module adopting the present invention.

Forms of embodying the present invention will now be explained in details while referring to the drawings. It should be noted that the present invention is not to be limited to the following embodiments alone but that various changes are possible without departing from the gist of the present invention.

The communication apparatus adopting the present invention is an apparatus which is incorporated in an electronic device and which is enabled to perform communication by receiving a magnetic field transmitted from a transmitter, and is used, for instance, by being incorporated in a radio communication system 100 for RFID (Radio Frequency Identification) as shown in FIG. 1.

The radio communication system 100 is comprised of a communication apparatus 1 and a reader/writer 120 which performs access to the communication apparatus 1. Here, the communication apparatus 1 and the reader/writer 120 shall be disposed to oppose each other in a xy plane of a three-dimensional Cartesian coordinate system xyz.

The reader/writer 120 functions as a transmitter for transmitting a magnetic field along a z axial direction with respect to the communication apparatus 1 which mutually oppose each other in the xy plane, and more particularly, it comprises an antenna 121 for transmitting a magnetic field towards the communication apparatus 1 and a control substrate 122 which performs communication with the communication apparatus 1 which is inductively coupled via the antenna 121.

More particularly, the reader/writer 120 is provided with the control board 122 which is electrically connected to the antenna 121. The control board 122 is mounted with a control circuit comprised of one or more electronic parts such as an integrated circuit chip. The control circuit performs various processes based on data that have been received from the communication apparatus 1. For instance, when data are to be transmitted to the communication apparatus 1, the control circuit encodes the data, modulates carrier waves of a specified frequency (for instance, 13.56 MHz) based on the encoded data, amplifies the modulated modulating signals and drives the antenna 121 by using the amplified modulating signal. When data are to be read from the communication apparatus 1, the control circuit amplifies the modulating signal of the data received by the antenna 121, demodulates the modulating signal of the amplified data and decodes the demodulated data. In this respect, the control circuit employs encoding methods and modulating methods that are used in general readers/writers examples of which are the Manchester encoding method or the ASK (Amplitude Shift Keying) modulating method.

The communication apparatus 1 comprises an antenna module 1a being installed, for instance, in an interior of a casing 131 of a mobile phone 130 which is disposed to oppose the reader/writer 120 in the xy plane and having an antenna substrate 11 mounted with an antenna coil 11a which is enabled to perform communication with the inductively coupled reader/writer 120, and a communication processing portion 12 which is driven through current flowing through the antenna coil 11a for performing communication with the reader/writer 120.

In this respect, the communication processing portion 12 can be driven through power from a battery pack 133 of the mobile phone 130 in which the communication apparatus 1 is installed (to be described later) or from a power supplying portion such as an external power source besides by the antenna coil 11a.

The antenna substrate 11 is mounted with an antenna coil 11a which is formed through, for instance, patterning processing a flexible conducting wire such as a flexible flat cable and with a terminal portion 11b for electrically connecting the antenna coil 11a and the communication processing portion 12.

Upon receiving a magnetic field transmitted from the reader/writer 120, the antenna coil 11a is magnetically coupled to the reader/writer 120 through inductive coupling, receives modulated electromagnetic waves and supplies a received signal to the communication processing portion 12 through the terminal portion 11b.

The communication processing portion 12 is driven through current flowing through the antenna coil 11a and performs communication with the reader/writer 120. More particularly, the communication processing portion 12 demodulates the received modulating signal, decodes the demodulated data and writes the decoded data to an internal memory provided in the communication processing portion 12. The communication processing portion 12 further reads data to be transmitted to the reader/writer 120 from the internal memory, encodes the read data, modulates the carrier waves based on the encoded data and transmits the modulated radio waves to the reader/writer 120 through the antenna coil 11a which has been magnetically coupled through inductive coupling.

EXAMPLE 1

The structure of the antenna module 1a in the radio communication system 100 having the above-described structure will now be explained as Example 1.

Figure 2A:
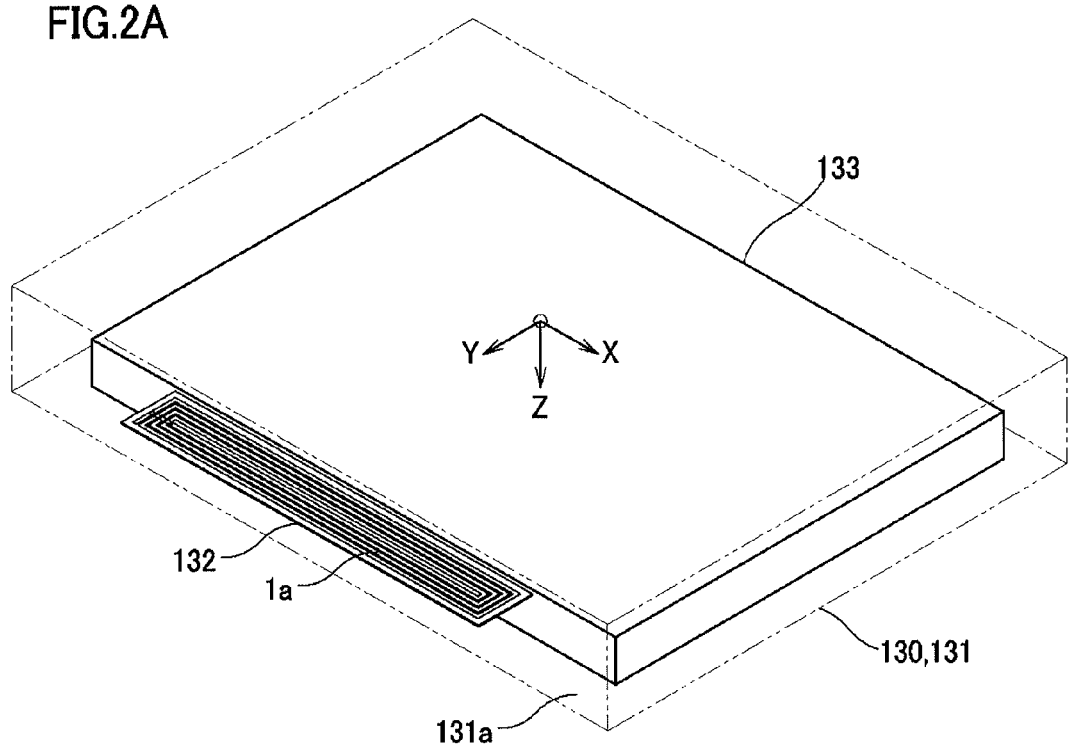
FIG. 2A is a perspective view for explaining an arrangement of an antenna apparatus adopting the present invention.

In view of achieving downsizing of an electronic device when installed in an electronic device such as a mobile phone 130 and realizing favorable communication properties with the reader/writer 120, the antenna coil 11a of the antenna module 1a according to Example 1 is disposed, for instance, on an xy plane of a three-dimensional Cartesian coordinate system xyz as shown in FIG. 2A in a clearance 132 between a battery pack 133 provided within a casing 131 of the mobile phone 130 and an inner peripheral wall 131a of the casing 131.

In this respect, the antenna module according to Example 1 can also be disposed, for instance, in a clearance between a conductive body such as an integrated circuit board disposed inside the casing 131 and the inner peripheral wall of the casing besides the above-mentioned case in which it is disposed in the clearance 132 between the battery pack 133 and the inner peripheral wall 131a of the casing 131. In the present example, explanations will be made based on a case in which the antenna module is disposed as a plate-like conductive body between an end portion 133b of a metallic plate 133a opposing the reader/writer 120 which is a metallic casing of the battery pack 133 as shown in FIG. 2B and the inner peripheral wall 131a of the casing 131 as a matter of convenience.

Figure 2B:
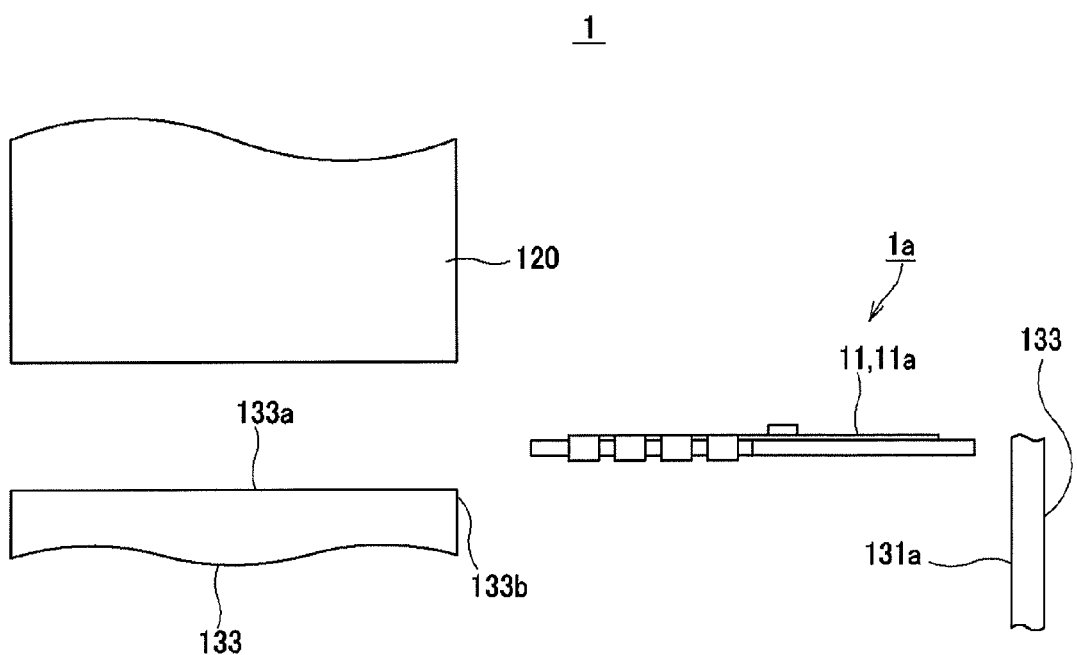
FIG. 2B is a sectional view for explaining the arrangement of the antenna apparatus adopting the present invention.

Here, as shown in the sectional view of FIG. 2B, the metallic plate 133a which is a metallic casing of the battery pack 133 disposed in the mobile phone 130 carries electricity in a relatively good manner so that an eddy current is generated upon addition of an alternating magnetic field from the exterior so as to reject the magnetic field. In examining a magnetic field distribution in case such an alternating magnetic field is added from the exterior, it exhibits properties in that the magnetic field of the end portion 133b of the metallic plate 133a of the battery pack 133 opposing the reader/writer 120 is strong.

Figure 3:
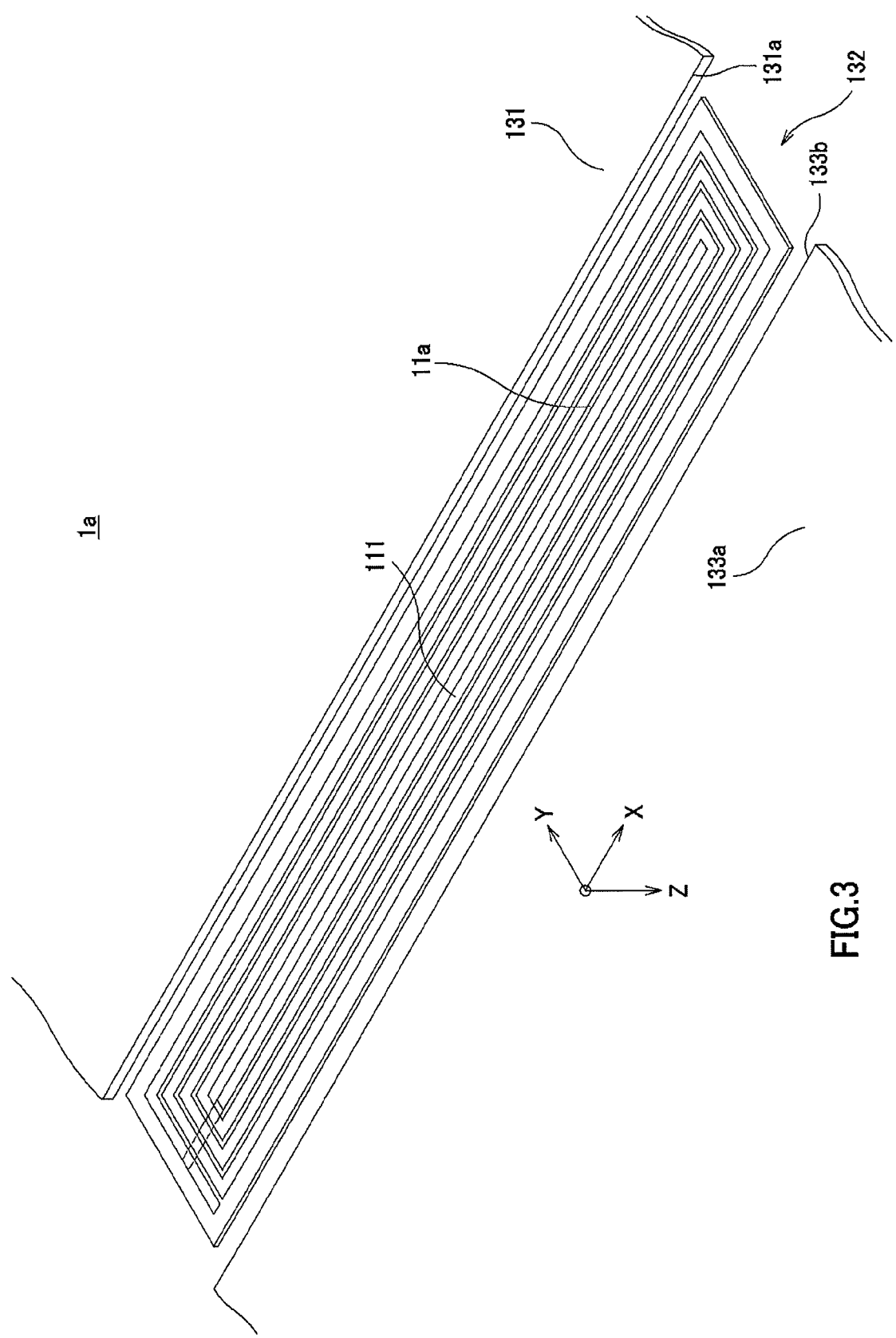
FIG. 3 is a view for explaining a configuration of the antenna module adopting the present invention.

For realizing favorable communication properties by utilizing properties of the magnetic field strength in the interior of the casing 131 of the mobile phone 130, the antenna coil 11a of the antenna module 1a can be disposed, as shown, for instance, in FIG. 3, in that a central axis 111 of the antenna coil 11a which is parallel to the z axis passes through the clearance 132 between the end portion 133b of the metallic plate 133a and the inner peripheral wall 131a of the casing 131 and in that the coil wire is wound in the clearance 132.

Figure 4A:
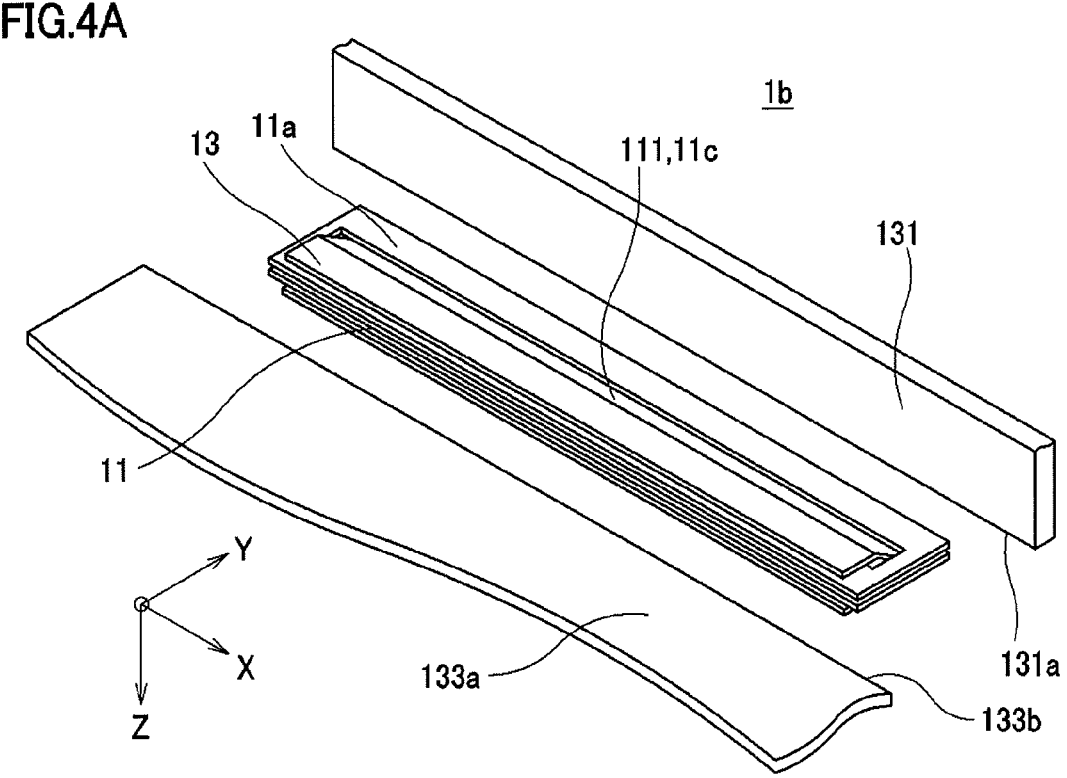
FIG. 4A is a perspective view for explaining a configuration of the antenna module adopting the present invention.
Figure 5A:
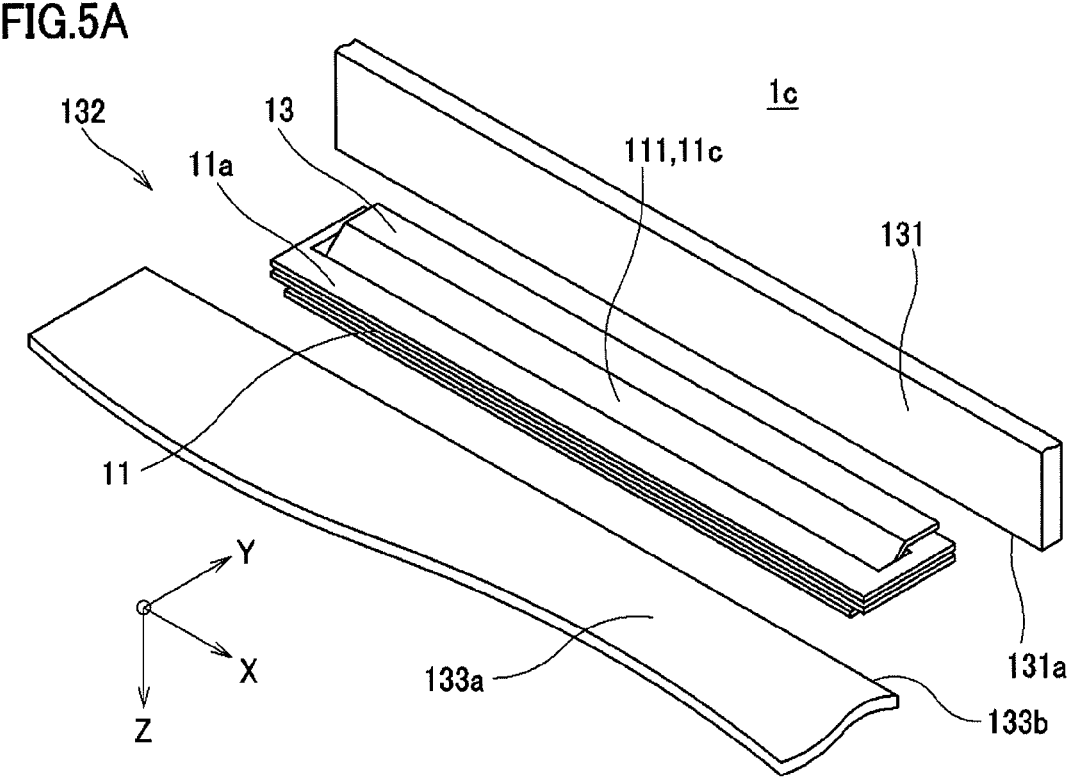
FIG. 5A is a perspective view for explaining a configuration of the antenna module adopting the present invention.

It is also possible to employ a configuration for antenna modules 1b, 1c with an antenna coil in which the central axis 111 of the antenna coil 11a which is parallel to the z axis passes through the clearance 132 and which is wound in the clearance 132 wherein a magnetic sheet 13 is inserted into a central portion 11c of the antenna substrate 11 as shown, for instance, in FIG. 4A and FIG. 5A.

Figure 4B:
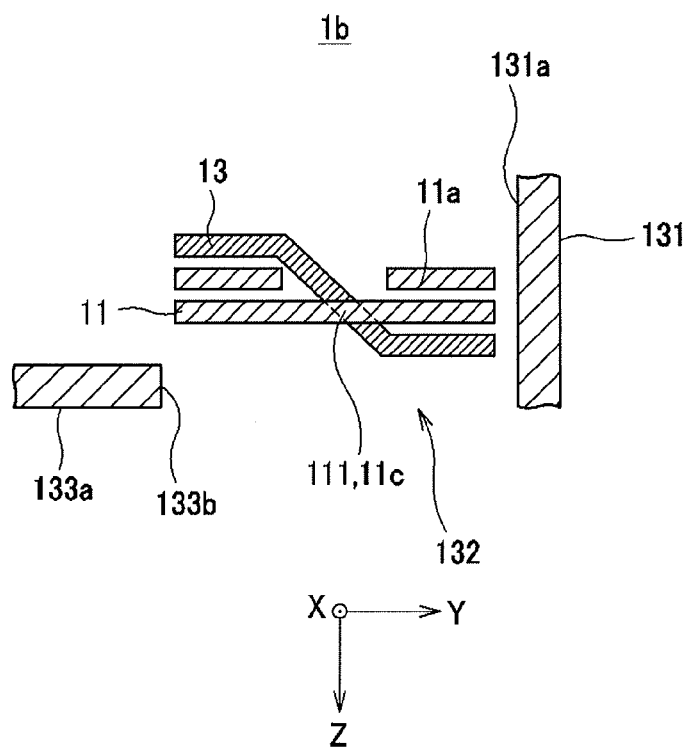
FIG. 4B is a sectional view for explaining the configuration of the antenna module adopting the present invention.

Here, the antenna module 1b as shown in FIG. 4A is arranged, as shown in FIG. 4B, in that the magnetic sheet 13 is inserted into the central portion 11c of the antenna coil 11a formed on the antenna substrate 11 such that the magnetic sheet 13 is located closer to the reader/writer 120 side than the antenna coil 11a on the end portion 133b side of the metallic plate 133a while the antenna coil 11a is located closer to the reader/writer 120 side than the magnetic sheet 13 on the inner peripheral wall 131a side of the casing 131.

Figure 5B:
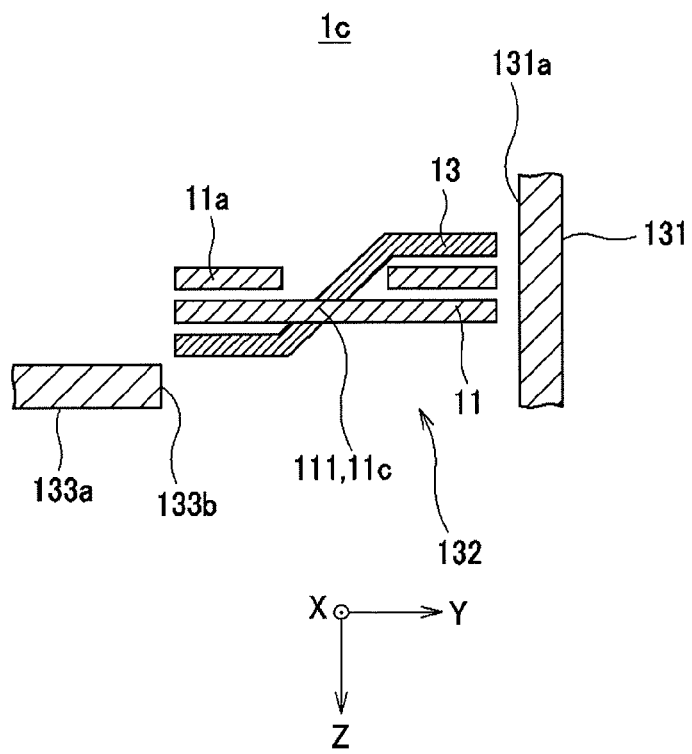
FIG. 5B is a sectional view for explaining the configuration of the antenna module adopting the present invention.

Further, the antenna module 1c as shown in FIG. 5A is arranged, as shown in FIG. 5B, in that the magnetic sheet 13 is inserted into the central portion 11c of the antenna coil 11a formed on the antenna substrate 11 such that the antenna coil 11a is located closer to the reader/writer 120 side than the magnetic sheet 13 on the end portion 133b side of the metallic plate 133a while the magnetic sheet 13 is located closer to the reader/writer 120 side than the antenna coil 11a on the inner peripheral wall 131a side of the casing 131.

Figure 6:
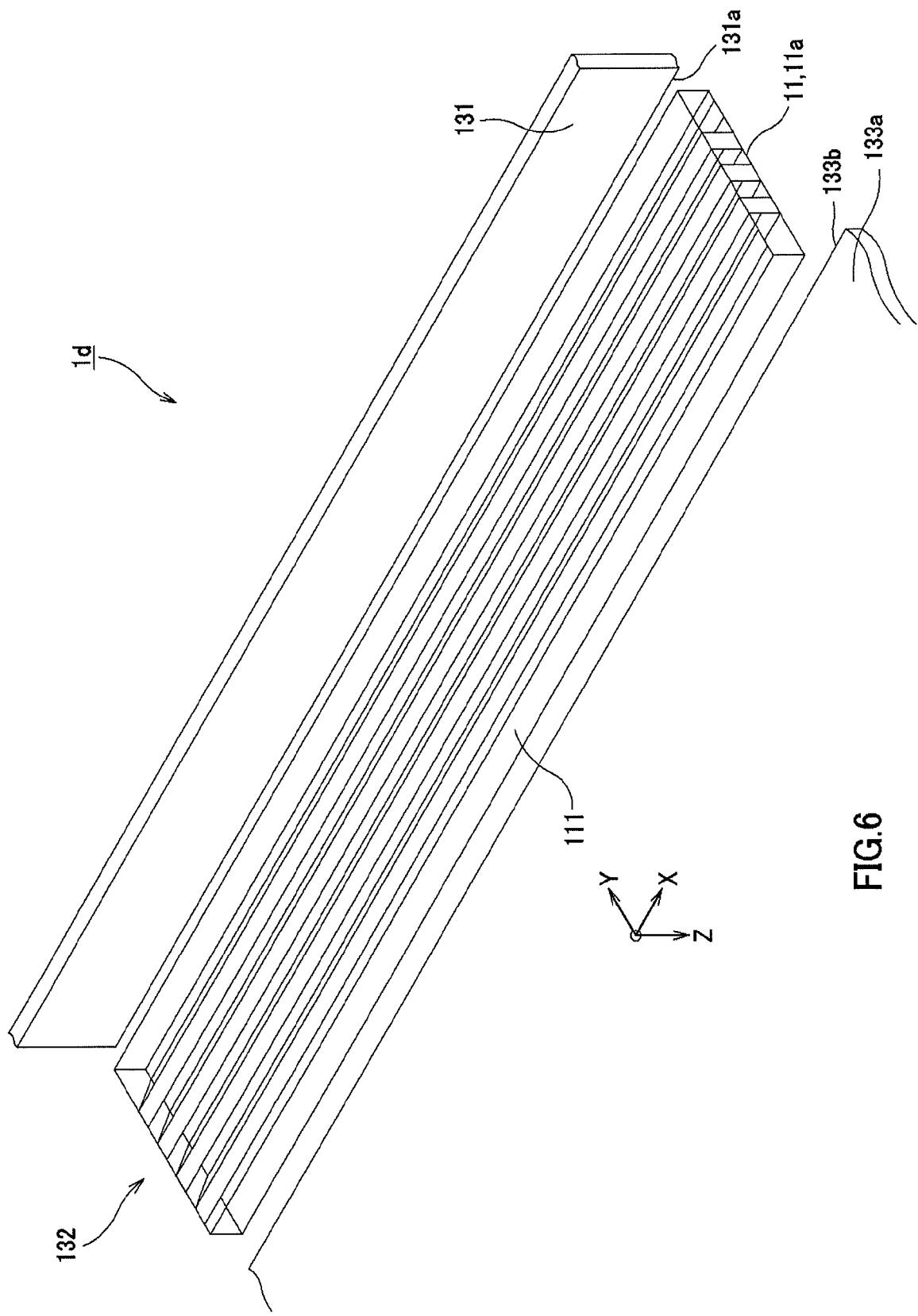
FIG. 6 is a perspective view for explaining a configuration of the antenna module adopting the present invention.

Moreover, the antenna coil 11a shall be wound such that it does not surround the outer periphery of the metallic plate 133a. In other words, it will be sufficient if the coil wire is wound such that the central axis of the antenna coil 11a passes through the clearance 132. For instance, it is possible to employ an antenna module 1d having an antenna coil 11a which is wound to surround a section which is defined by the xy plane of the antenna substrate 11 disposed in the clearance 132 as shown in FIG. 6 and having a winding direction which is parallel to the inner peripheral wall 131a.

In Example 1, evaluations are made using communication properties of antenna module 1b from among the above-described four types of antenna modules of different antenna structures. This is because the magnetic sheet 13 of the antenna module 1b is disposed such that the magnetic field which is generated around the end portion 133b of the metallic plate 133a can be effectively drawn into the antenna coil 11a in comparison to the other antenna modules 1a, 1c and 1d.

Figure 7:
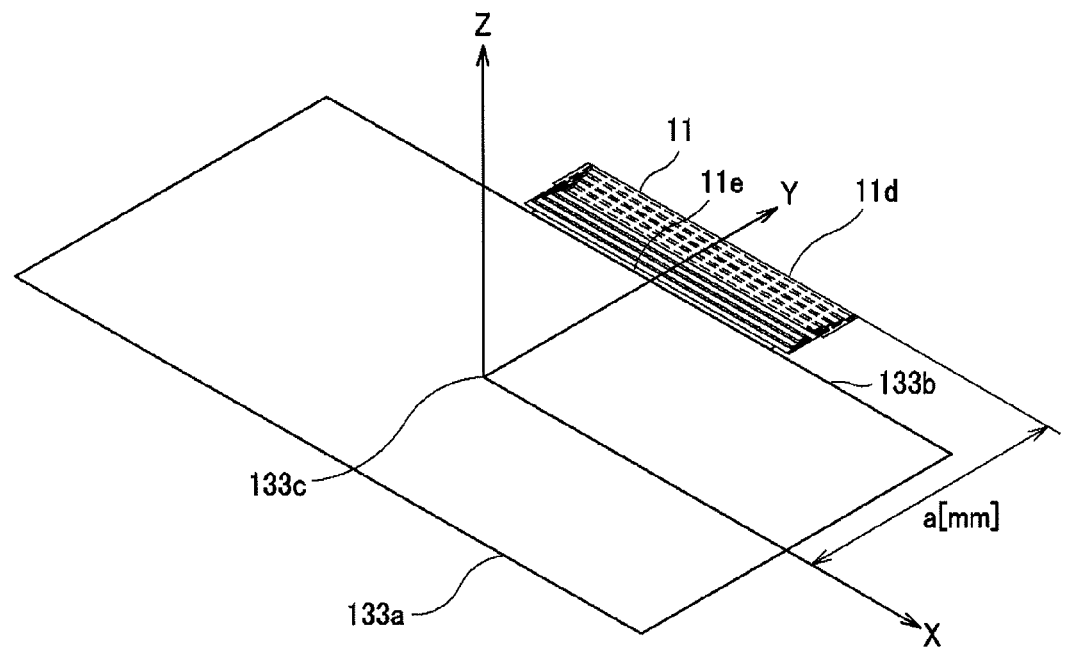
FIG. 7 is a view for explaining a relative positional relationship between a metallic plate and an antenna substrate.
Figure 7:
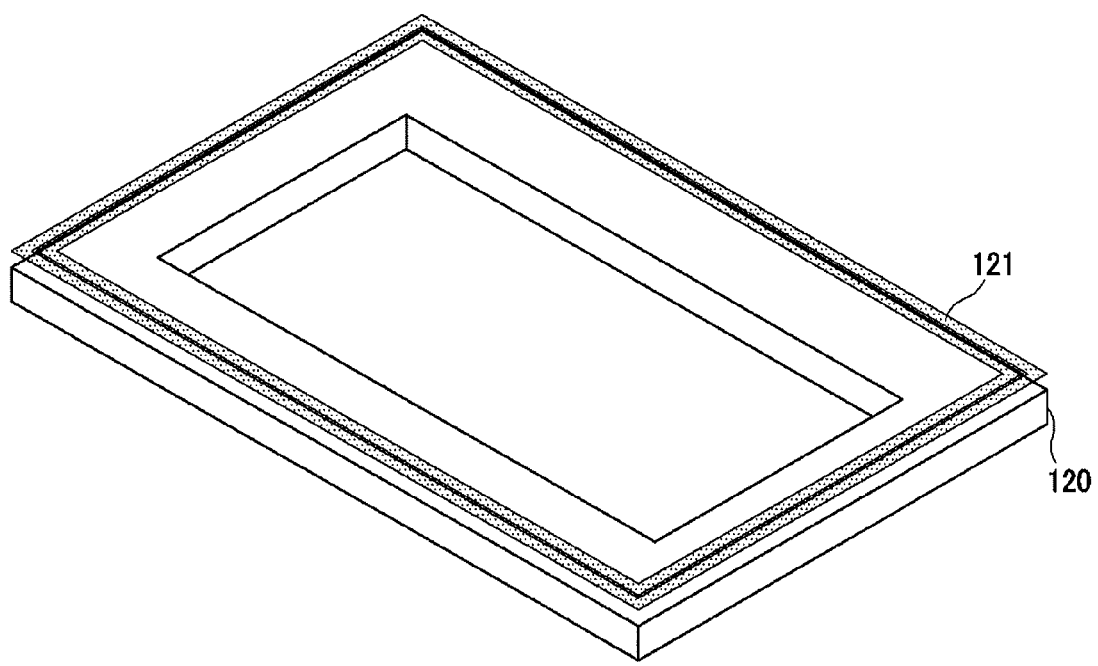

First, as for efficiency evaluation, communication properties are evaluated when the relative positional relationship between the metallic plate 133a and the antenna substrate 11 is changed while the metallic plate 133a and the reader/writer 120 are made to oppose as shown in FIG. 7.

Concrete conditions for evaluation were as follows. Namely, the antenna 121 of the reader/writer 120 was a double-wound coil having an external form of 66 m×100 mm defined in xy axial directions. The metallic plate 133a was made of stainless steel having a dimension of 100 mm×50 mm×0.3 mm defined in xyz axial directions. The antenna coil 11a of the antenna module 1b had a configuration with an external form of 40 mm×10 mm defined in xy axial directions and was a fourfold-wound coil. Moreover, the distance from the surface of the metallic plate 133a to the surface of the antenna coil 11a defined in a z axial direction was set to be 1 mm.

Here, the following value of "a" was used as a value for indicating a relative positional relationship between the metallic plate 133a and the antenna substrate 11. That is, the value of "a" is a distance defined in the y axial direction from the central portion 133c of the metallic plate 133a to the end portion 11d on the inner peripheral wall 131a side of the antenna substrate 11.

Figure 8:
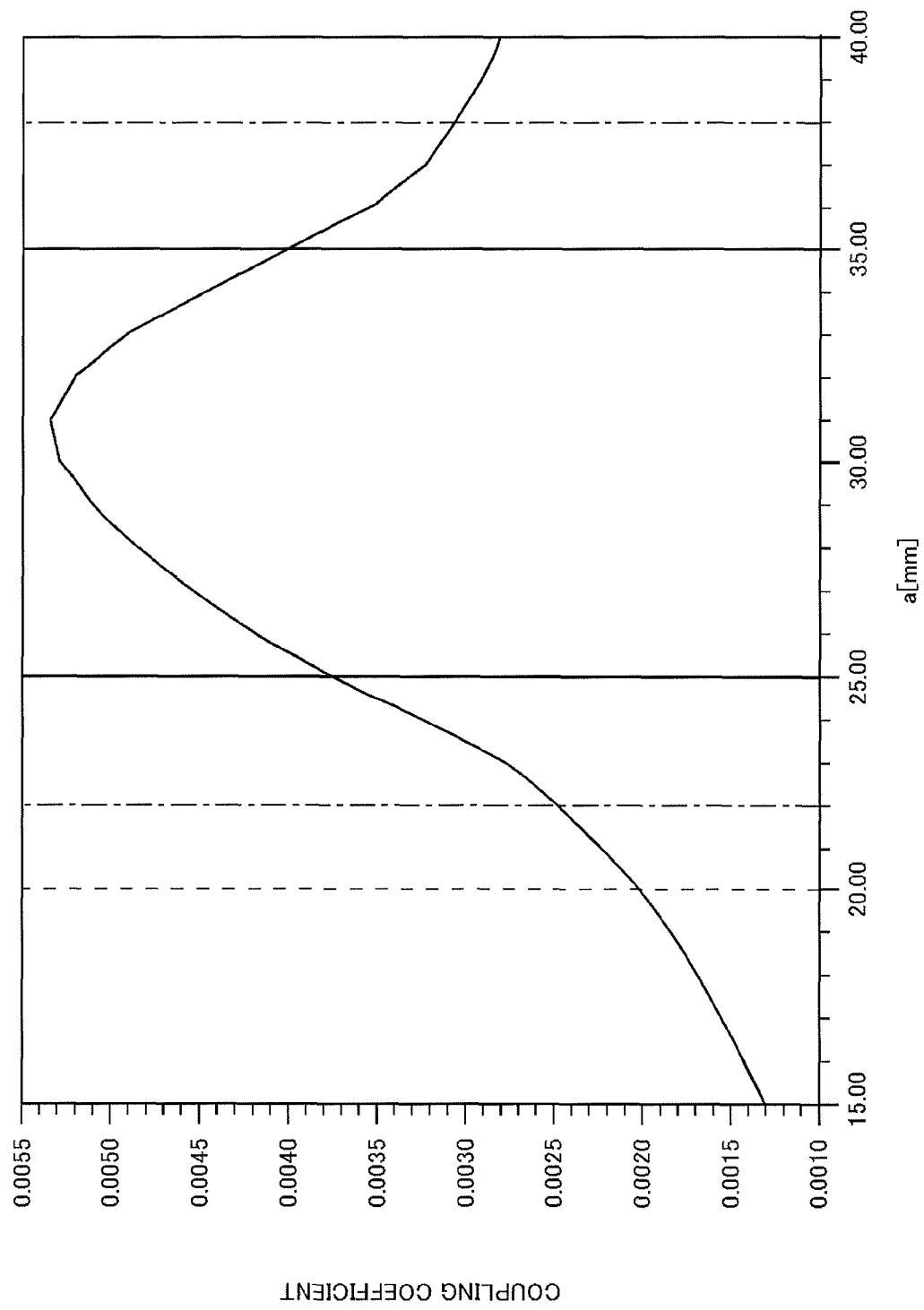
FIG. 8 is a view showing coupling coefficients of the antenna coil according to Example 1 when the relative positional relationship of the metallic plate and the antenna substrate is changed.
Figure 9:
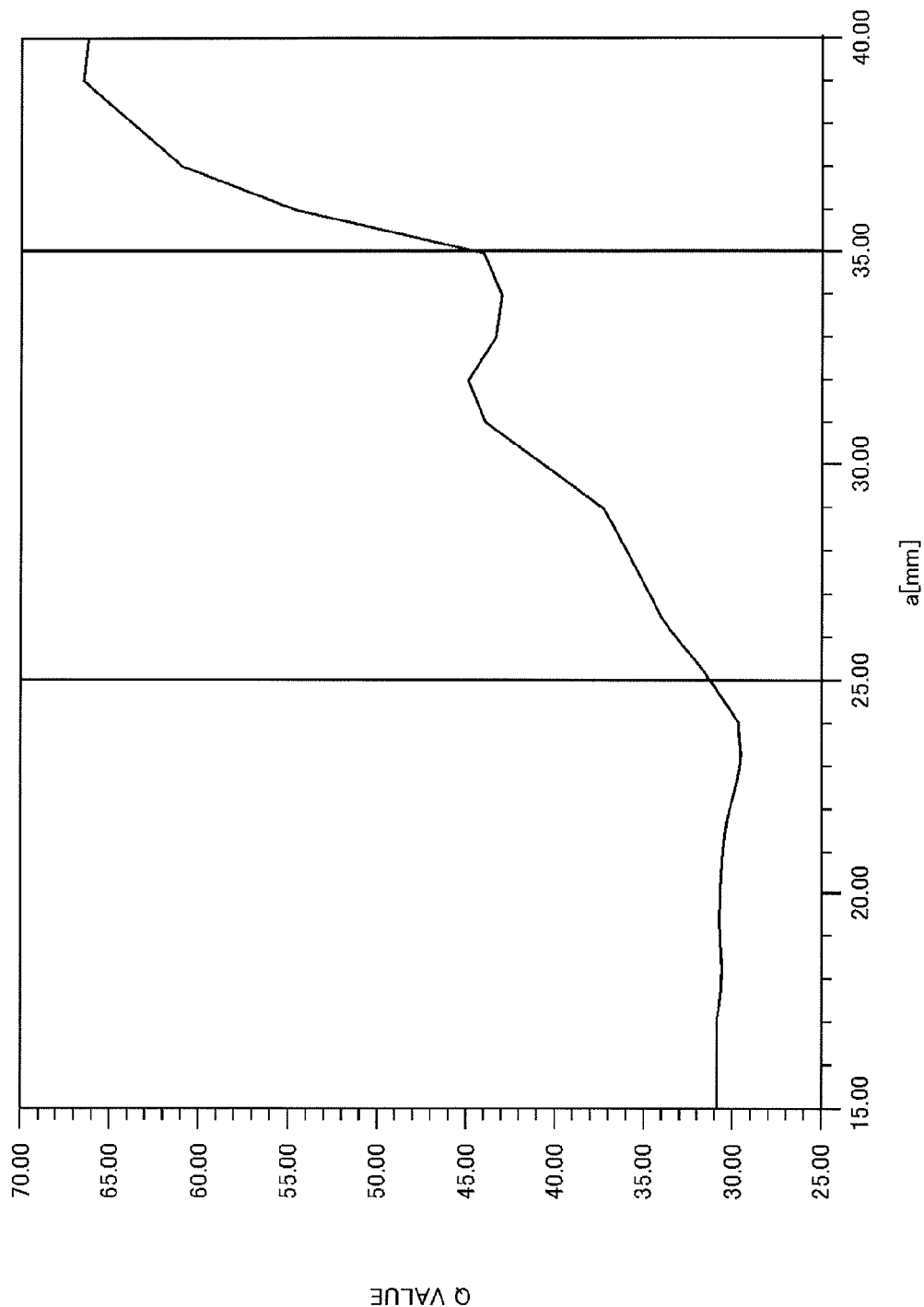
FIG. 9 is a view showing Q values of the antenna coil according to Example 1 when the relative positional relationship of the metallic plate and the antenna substrate is changed.

Changes in coupling coefficients of the antenna coil 11a when the value of a is changed from 15 mm to 40 mm under the above-described condition are shown in FIG. 8 while changes in Q values are shown in FIG. 9, respectively.

Here, since the width of the metallic plate 133a is 50 mm, the end portion 133b of the metallic plate 133a coincides with the end portion 11d on the inner peripheral wall 131a side of the antenna coil 11a when the value of "a" is 25 mm. Further, since the width of the antenna coil 11a is 10 mm, the end portion 11e on the metallic plate 133a side of the antenna coil 11a coincides with the end portion 133b of the metallic plate 133a when the value of "a" is 35 mm.

As shown in FIG. 8, the coupling coefficient is highest when the value of "a" is 30 mm and the central portion 11c of the antenna substrate 11 substantially coincides with the end portion 133b of the metallic plate 133a, and reduces when the value of "a" separates from 30 mm. The coupling coefficients exhibit substantially identical properties when the value of "a" is 25 mm and 35 mm. The reason why coupling coefficients are high when the antenna coil 11a is disposed proximate of the end portion 133b of the metallic plate 133a is that the magnetic flux density is high in the periphery of the end portion 133b of the metallic plate 133a. Further, an eddy current is generated on the metallic plate 133a upon receiving a magnetic field transmitted from the reader/writer 120 due to the fact that the magnetic field intensity at the end portion 133b is larger than that at the central portion 133c so that the magnetic energy that is received from the reader/writer 120 can be effectively transmitted to the antenna coil 11a side.

In comparing a case in which the value of "a" is changed to become smaller than 25 mm to a case in which the value of "a" is changed to become larger than 35 mm, while the coupling coefficients reduce in both cases, the diminution of the coupling coefficient is smaller in response to changes in the value of "a" when it is changed to be become larger than 35 mm. For instance, when comparing cases in which the value of "a" are 22 mm and 38 mm, the coupling coefficient is higher by approximately 20% when the value of "a" is 38 mm. Further, when comparing cases in which the values of "a" are 20 mm and 40 mm, the coupling coefficient is higher by approximately 40% when the value of "a" is 40 mm.

As shown in FIG. 9, in accordance with the antenna coil 11a separating from the metallic plate 133a, the Q value is monotonously increased, and particularly when the value of "a" becomes larger than 35 mm, which is, the antenna coil 11a does no more superpose the metallic plate 133a, the Q value abruptly increases.

The reason is that the more the antenna coil 11a separates from the metallic plate 133a, the more the metallic plate 133a is restricted of receiving the magnetic field which is generated by the current flowing through the antenna coil 11a and of converting the same into thermal energy such that the resistance value of the antenna coil 11a becomes seemingly smaller.

It can be understood from the above-described efficiency evaluation that the central portion 11c of the antenna substrate 11 shall substantially coincide with the end portion 133b of the metallic plate 133a in order to simply improve the coupling coefficient, it is required that both of a high coupling coefficient and a high Q value are consistent in order to achieve favorable communication properties. Accordingly, it is particularly favorable that the antenna coil 11a is disposed at a position which is proximate of the metallic plate 133a and at which it does not superpose the metallic plate 133a in view of establishing both, a high coupling coefficient and a high Q value so as to consequently obtain favorable communication properties.

In this manner, since the antenna module 1b and the antenna modules 1a, 1c and 1d according to the present example are disposed in that the antenna coil 11a is wound in the clearance 132 so as not to surround the outer peripheral portion of the metallic plate 133a, it is possible to achieve downsizing of the casing 131 when it is incorporated in an electronic device such as a mobile phone 130. Further, the antenna module 1b and the antenna modules 1a, 1c and 1d according to the present example can realize favorable communication properties by utilizing magnetic properties by the metallic plate 133a opposing the reader/writer 120.

MODIFIED EXAMPLE

Figure 10:
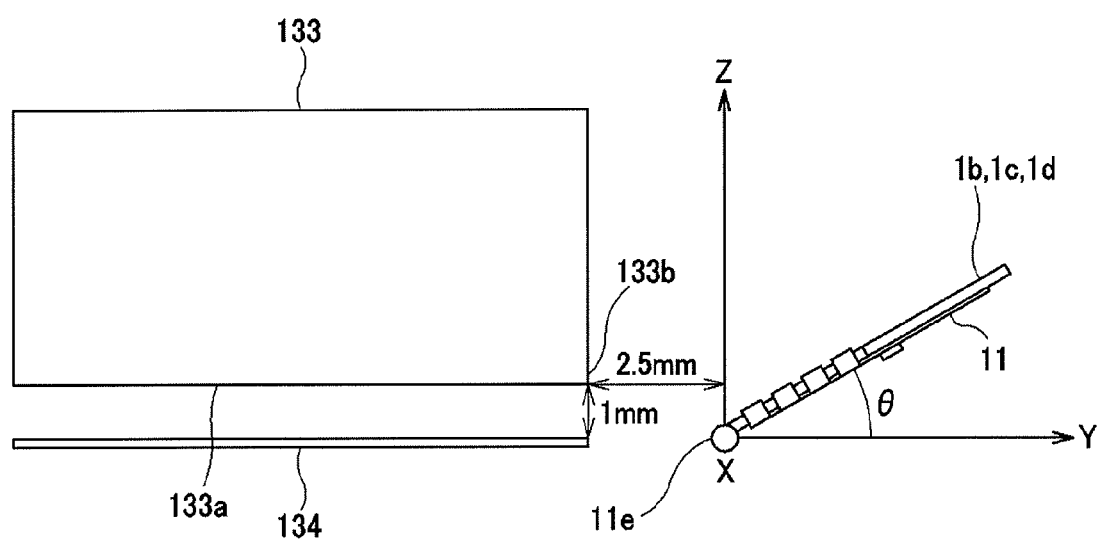
FIG. 10 is a view for explaining a configuration when an angle θ for inclining the antenna substrate 11 with respect to a surface xy opposing a reader/writer 120 is changed.

As for antenna modules 1b, 1c and 1d from among the antenna modules 1a, 1b, 1c and 1d of the present example, it is possible to realize favorable communication properties while effectively utilizing the space of the clearance 132 by arranging the antenna modules substrate 11 to be inclined with respect to surface xy opposing the reader/writer 120 with the end portion 11e on the metallic plate 133a side being the central axis as shown in FIG. 10. In this respect, a magnetic sheet 134 is provided to superpose the metallic plate 133a in FIG. 10 such that the metallic plate 133a does not reject the magnetic field from the reader/writer 120. The angle of inclining the antenna substrate 11 with respect to the surface xy opposing the reader/writer 120 with the end portion 11e on the metallic plate 133a side being the central axis is defined to be θ.

Next, communication properties of the antenna coil 11a when the inclination angle θ is changed will now be evaluated.

Conditions of evaluation were as follows. Namely, the antenna 121 of the reader/writer 120 was a double-wound coil having an external form of 66 m×100 mm. The metallic plate 133c was an aluminum plate having an external form which is defined in xyz axial directions of 60 mm×45 mm×5 mm. The antenna coil 11a had a configuration with an external form of 40 mm×5 mm defined in xy axial directions with a magnetic sheet 13 being inserted into the central portion 11c and was a fourfold-wound coil. Moreover, the distance from the surface of the metallic plate 133a to the end portion 11e of the antenna coil 11a defined in the z axial direction was set to be 1 mm. Further, the distance from the end portion 133b of the metallic plate 133a to the end portion 11e of the antenna coil 11a which is defined in the y axial direction was set to be 2.5 mm.

Figure 11:
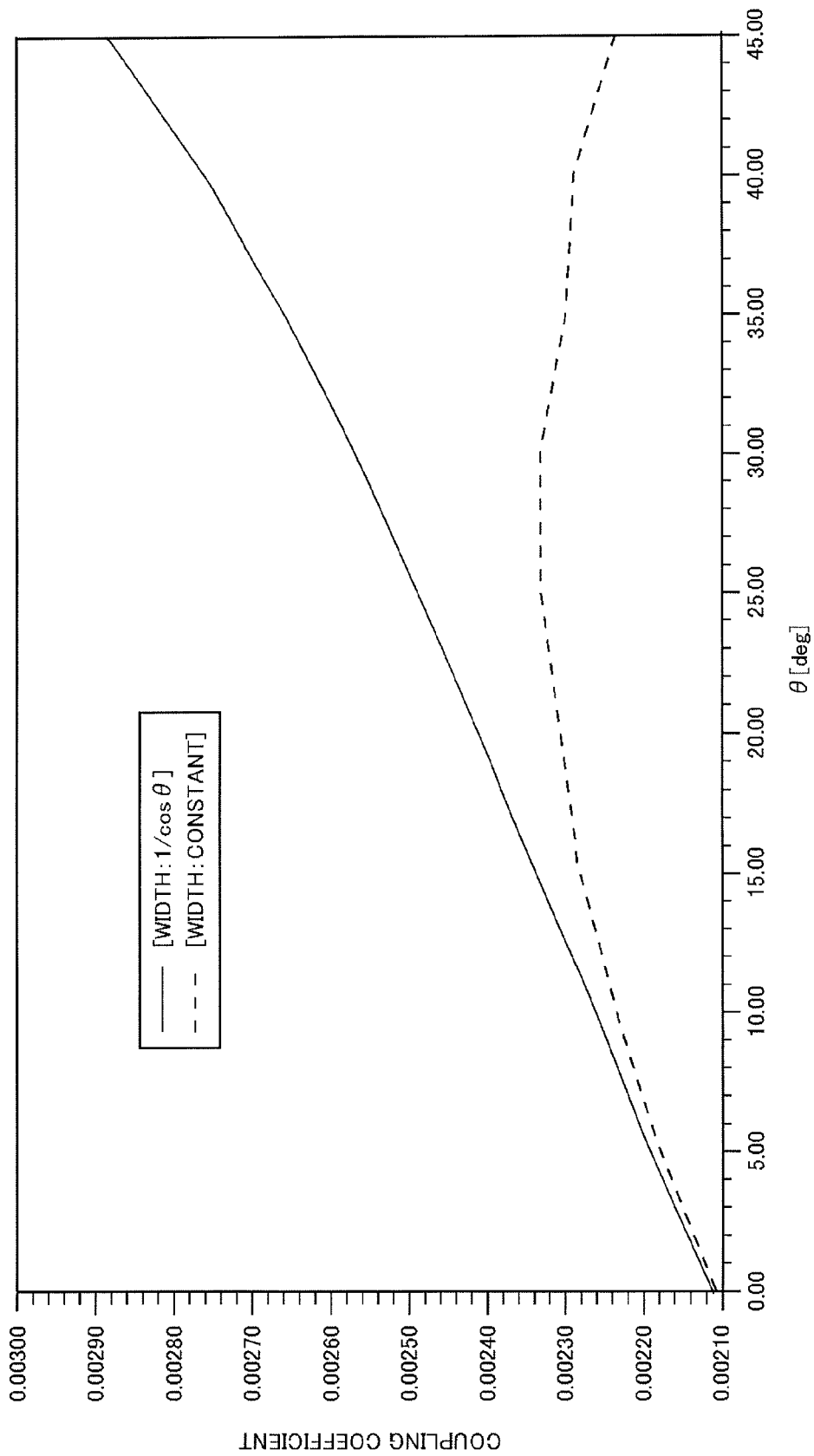
FIG. 11 is a view for explaining coupling coefficients of the antenna coil when the angle θ for inclining the antenna substrate 11 with respect to the surface xy opposing the reader/writer 120 is changed.

Under the above-mentioned conditions of evaluation, coupling coefficients of "width: constant" wherein the shape of the antenna substrate 11 is constant and of "width: 1/cos θ" wherein the width from the end portion 11d of the antenna coil 11a to the other end portion 11e is changed in accordance with the inclination angle θ so as to satisfy "1/cos θ" are shown in FIG. 11.

As shown in FIG. 11, improvements in coupling coefficients can be seen when the inclination angle θ is inclined from 0 degree. In case of "width: constant", properties are highest at an angles of 25 to 30 degrees.

In case of "width: 1/cos θ", the width of the antenna coil 11a becomes larger in accordance with the increase in the inclination angle θ so that the coupling coefficient becomes higher. It is therefore preferable for the antenna coil 11a to set the width of the antenna coil 11a to be as large as possible within a range with which it can be accumulated in the clearance 132 when the antenna substrate 11 is inclined at inclination angle θ. For instance, when the region of the clearance 132 which is defined in a ZY surface in the inner structure of the casing 131 is substantially square, an angle θ of approximately 45 degrees is particularly suitable in view of effectively utilizing the space of the clearance 132.

Figure 12:
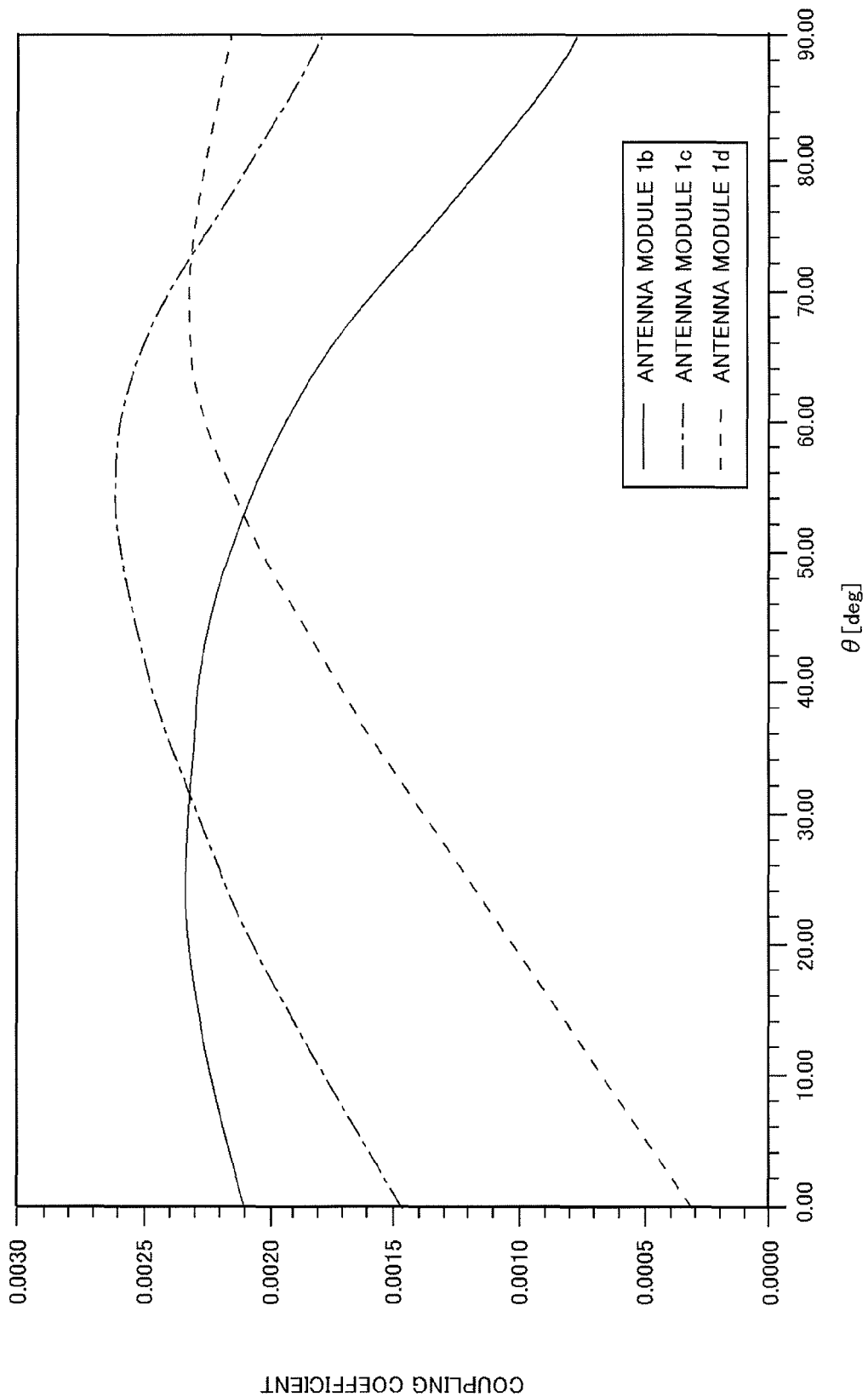
FIG. 12 is a view for explaining coupling coefficients of the antenna coil when the angle θ for inclining the antenna substrate 11 with respect to the surface xy opposing the reader/writer 120 is changed.

Properties of coupling coefficients under the above-mentioned conditions of evaluation when the shape of the antenna substrate 11 is constant and when the structure configuration of the antenna coil 11a is as that of the antenna modules 1b, 1c and 1d will now be shown in FIG. 12.

As shown in FIG. 12, properties are highest when the antenna coil 11a of antenna module 1b is inclined at an angle of 25 to 30 degrees while properties of the antenna coil 11a of antenna modules 1c and 1d are highest when it is inclined at an angle of 45 degrees and more.

Accordingly, while there are conditions for the angles that coupling coefficients become higher by setting large inclination angles θ for antenna modules 1b, 1c and 1d, particularly antenna module 1b is suitable from the aspect of effectively utilizing the space of the clearance 132 when the thickness of the clearance 132 which is defined in the z axial direction is limited in view of thinning.

In this manner, by arranging the antenna modules 1b, 1c and 1d such that the antenna substrate 11 is inclined with respect to the surface xy opposing the reader/writer 120 with the end portion 11e on the metallic plate 133a side being the central axis, it is possible to realize favorable communication properties while effectively utilizing the space of the clearance 132. Further, when the thickness of the clearance 132 which is defined in the z axial direction is limited in view of thinning, particularly antenna module 1b is capable of realizing favorable communication properties while effectively utilizing the space of the clearance 132.

EXAMPLE 2

A communication apparatus according to Example 2 adopting the present invention will now be explained. This communication apparatus is an electronic device incorporating therein the antenna module 1a, 1b, 1c or 1d according to the above-described Example 1. In the present example, concrete explanations will be made using a mobile phone 230 as shown in FIG. 13.

Figure 13A:
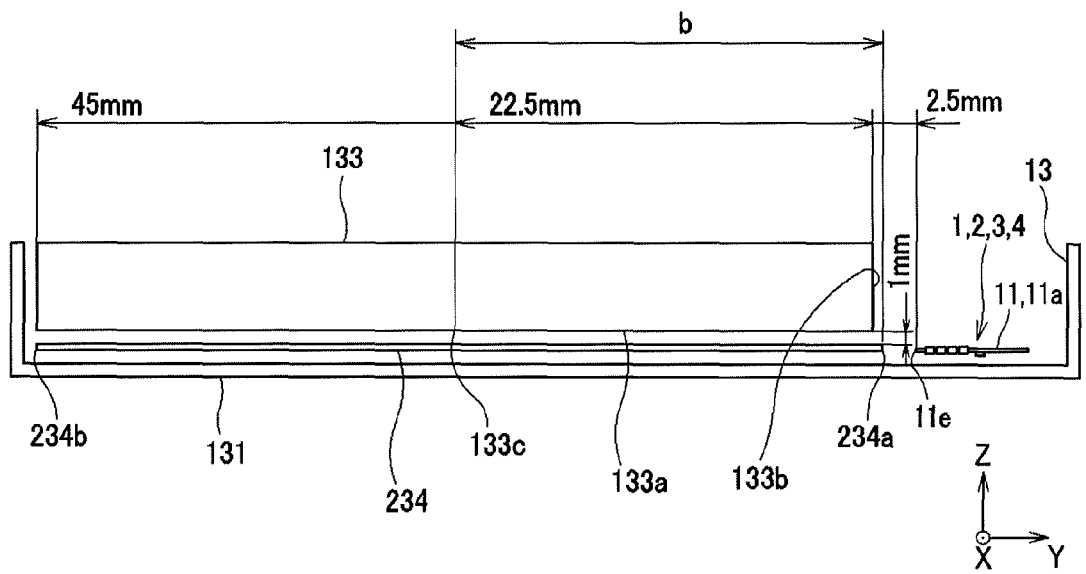
FIG. 13A and FIG. 13B are views for explaining a communication apparatus according to Example 2 adopting the present invention.

More particularly, the mobile phone 230 comprises, similarly to the above-described mobile phone 130, a battery pack 133, and any one antenna module from among the antenna modules 1a, 1b, 1c and 1d within a casing 131 as shown in FIG. 13A. The mobile phone 230 is here provided with a magnetic sheet 234 as to superpose a metallic plate 133a opposing a reader/writer 120 of the battery pack 133 so that a magnetic field is effectively drawn into the antenna coil 11a of the antenna module 1a, 1b, 1c or 1d. While the magnetic sheet 234 superposes the metallic plate 133a as described above for preventing the metallic sheet 133a from rejecting the magnetic field from the reader/writer 120, it is further disposed, for more effectively drawing the magnetic field into the antenna coil 11a, in that an end portion 234a on the antenna coil 11a side extends towards the antenna coil 11a side so as not to superpose a surface opposing the reader/writer 120 of the antenna coil 11a opposing the reader/writer 120 as shown in FIG. 13B.

The reason of not superposing the magnetic sheet 234 onto the surface of the antenna coil 11a opposing the reader/writer 120 is that superposing the same would unfavorably restrict the magnetic field that the antenna coil 11a receives.

Figure 13B:
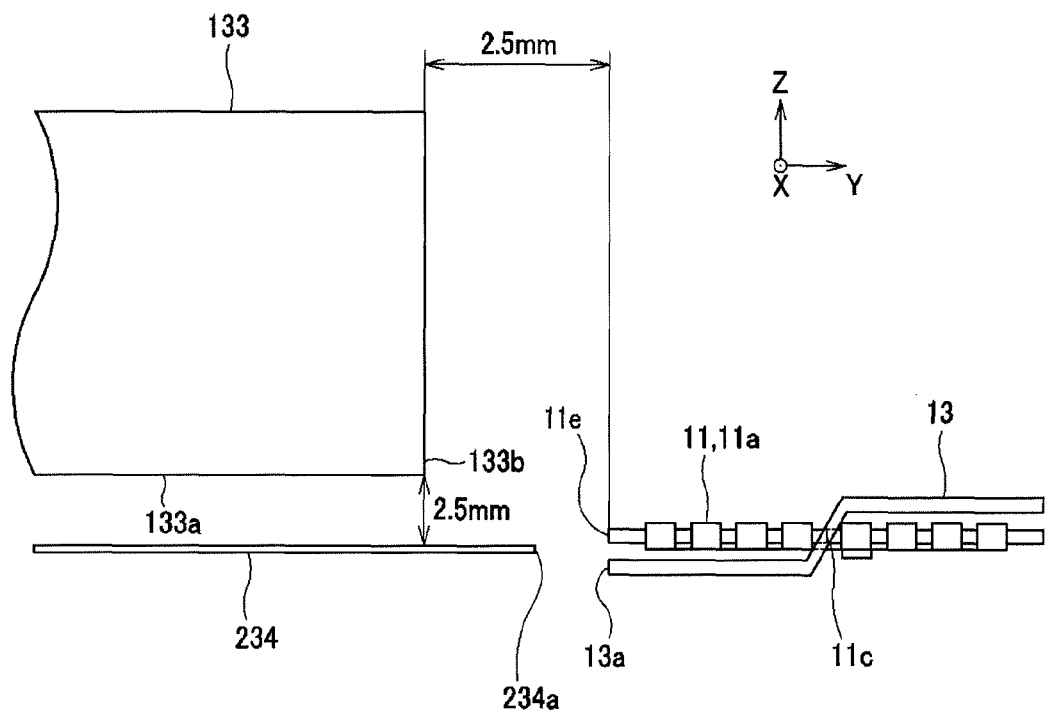

In this respect, FIG. 13B shows a structure configuration in which a magnetic sheet 13 is inserted into a central portion 11c of the antenna coil 11a of antenna module 1b from among the antenna modules 1a, 1b, 1c and 1d that are incorporated in the mobile phone 230.

Communication properties of the antenna coil 11a will now be evaluated when the relative positions between the end portion 234a of the magnetic sheet 234 superposed on the metallic sheet 133a and the antenna coil 11a is changed.

Figure 14:
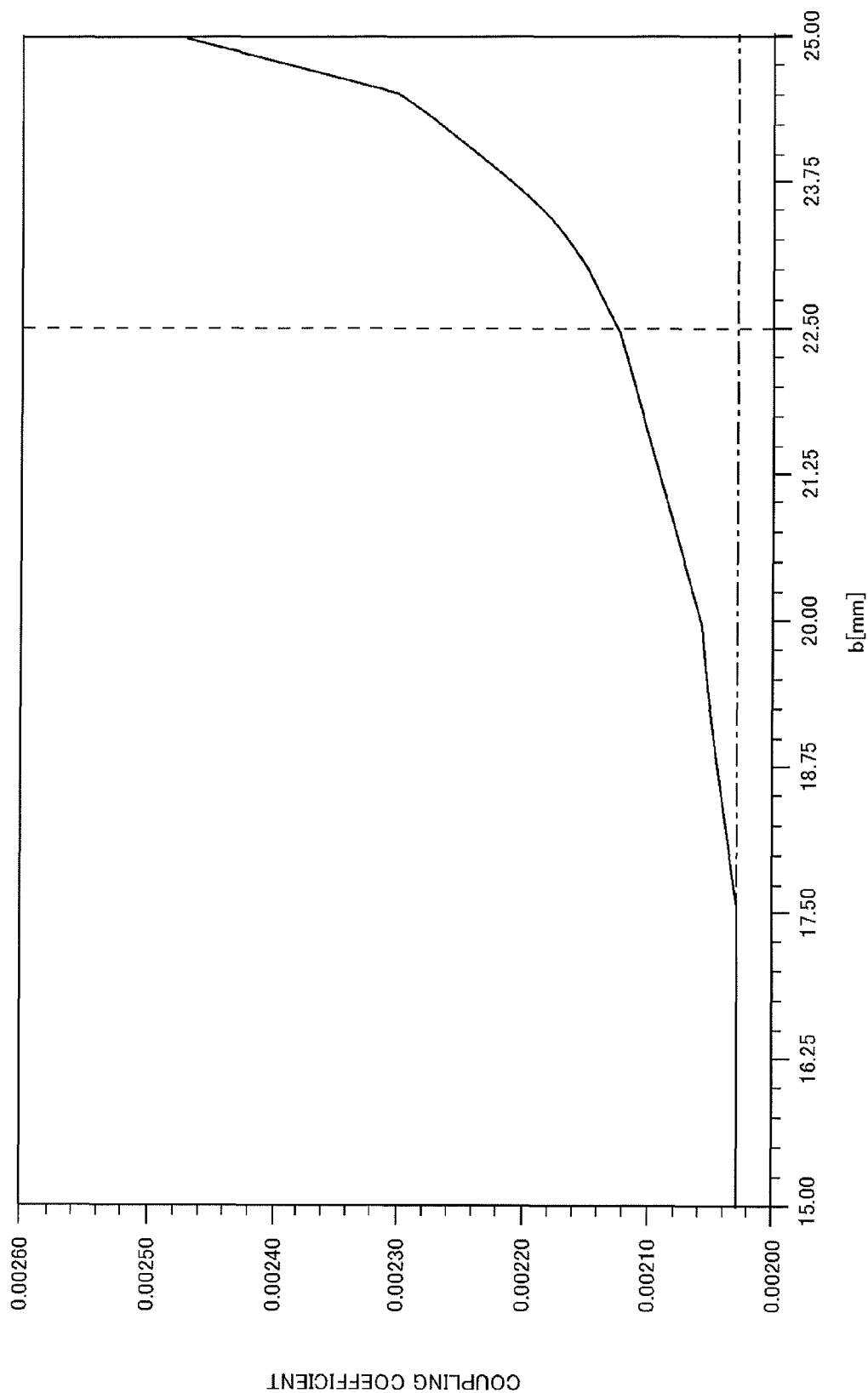
FIG. 14 is a view for explaining coupling coefficients of the antenna coil when the relative positional relationship between an end portion of a magnetic sheet superposing the metallic plate and the antenna coil is changed.

Concrete conditions for evaluation were as follows. Namely, the antenna 121 of the reader/writer 120 was a double-wound coil having an external form of 66 m×100 mm defined in xy axial directions. The metallic plate 133a was an aluminum plate having a dimension of 60 mm×45 mm×5 mm. The antenna coil 11a was configured to have an external form of 40 mm×5 mm defined in the xy axial direction with a magnetic sheet 13 being inserted into the central portion 11c and was a fourfold-wound coil. Moreover, the distance from the surface of the metallic plate 133a to the end portion of 11e of the antenna coil 11a defined in the z axial direction was set to be 1 mm. Further, the distance from the end portion 133b of the metallic plate 133a to the end portion 11e of the antenna coil 11a which is defined in the y axial direction was set to be 2.5 mm. Further, a magnetic sheet 234 having a thickness of 0.1 mm was adhered onto the metallic plate 133a and its size in the width direction defined in the y axial direction was changed to obtain a coupling coefficient thereof. The coupling coefficients are shown in FIG. 14. Here, there are shown in FIG. 14 changes in coupling coefficients when a width b defined in the y axial direction from the central portion 133c of the metallic plate 133a to the end portion 234a of the magnetic sheet 234 is changed in the range of 15 mm to 25 mm.

Here, since the width in the y axial direction of the metallic sheet 133a is 45 mm, the end portion 234a of the magnetic sheet 234 coincides with the end portion 133b of the metallic plate 133a when the value of b is 22.5 mm. When the value of b is 25 mm, the end portion 234a of the magnetic sheet 234 coincides with the end portion 11e of the antenna coil 11a and the end portion 13a of the magnetic sheet 13, respectively.

As shown in FIG. 14, when the value of b changes from 22.5 mm to 25 mm, the coupling coefficient of the antenna coil 11a abruptly increases in accordance with this change.

This is because the magnetic field that flows in parallel to the metallic plate 133a can be drawn into the antenna coil 11a via the magnetic sheet 234 without diverging the magnetic field proximate to the end portion 133b.

In this manner, since the end portion 234a on the antenna coil 11a side extends towards the antenna coil 11a side so as not to superpose the surface of the antenna coil 11a opposing the reader/writer 120 in the mobile phone 230, it is possible to effectively draw the magnetic field into the antenna coil 11a so as to consequently realize favorable communication properties.

EXAMPLE 3

As described above, it is preferable to arrange the antenna coil 11a of the antenna module adopting the present invention proximate of the metallic plate 133a and at a position that does not superpose the metallic plate 133a in view of establishing both, a high coupling coefficient and a high Q value.

Figure 15A:
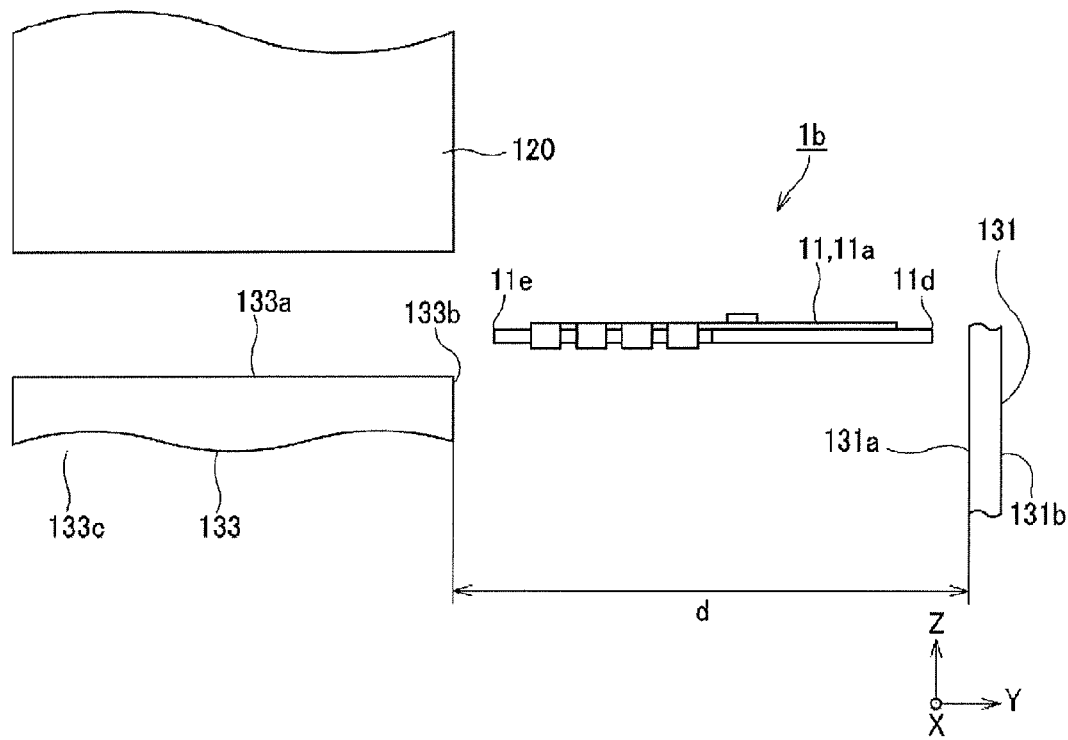
FIG. 15A and FIG. 15B are views for explaining changes in communication properties in accordance with dimensions of the antenna coil.
Figure 15B:
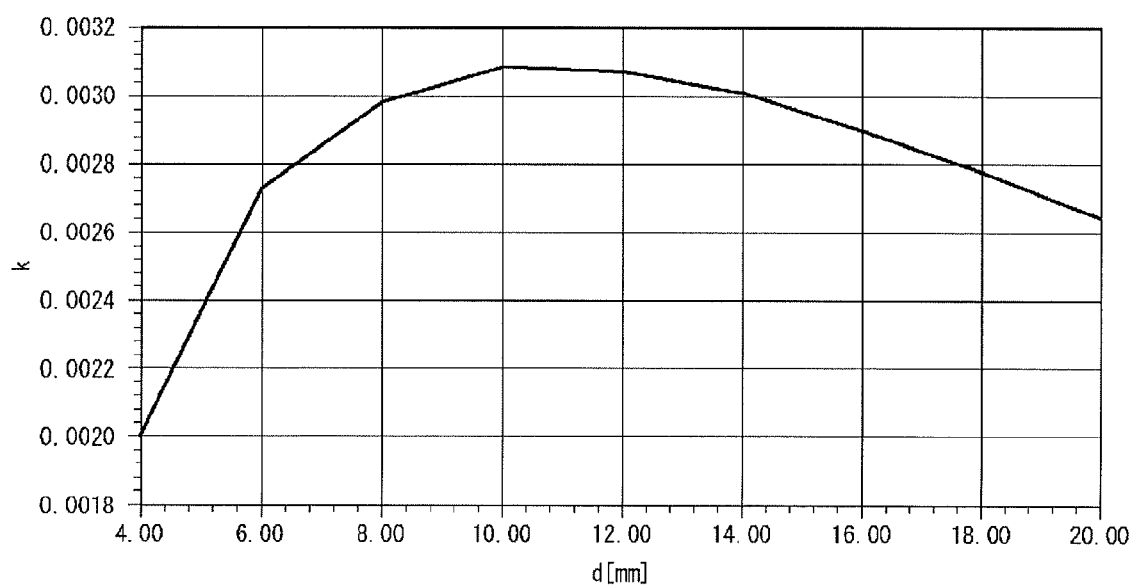

Here, when inductive coupling is to be performed with the reader/writer 120 through a magnetic field utilizing a transmission frequency of 13.56 MHz, the distance between the inner peripheral wall 131a of the casing 131 and the end portion 133b of the metallic plate 133a, which is, a width of the clearance 132 which is defined in the y axial direction is defined to be d [mm] as shown in FIG. 15A. When this width d [mm] is changed, an area of the antenna coil 11a which is defined by the xy plane is fixed to be 300 [mm$^2$], and the width d−1 [mm] of the antenna coil 11a in the y axial direction is changed so as to substantially coincide with the width d [mm] of the clearance 132, the coupling coefficients change as shown in FIG. 15B. In this respect, evaluations are made using the antenna coil 11a of the antenna module 1b as a matter of convenience in FIG. 15B.

As it is apparent from the results of FIG. 15B, the coupling coefficient increases in accordance with the increase in width d [mm], which is, the width of the clearance 132 as well as the width of the antenna coil 11a, and the coupling coefficient becomes large with the peak being approximately 10.00 mm when the width d [mm] is approximately 8.00 to approximately 14.00 mm. While the coupling coefficient becomes large when the width d [mm] is in the range of approximately 8.00 to approximately 10.00 mm, improvement in the communication properties substantially saturate even if the width is increased to be larger than approximately 10.00 mm. Such properties are due to the fact that the periphery of the casing 131, namely the magnetic force density of the clearance 132 is relatively large on the outer peripheral wall 131b side.

Figure 16A:
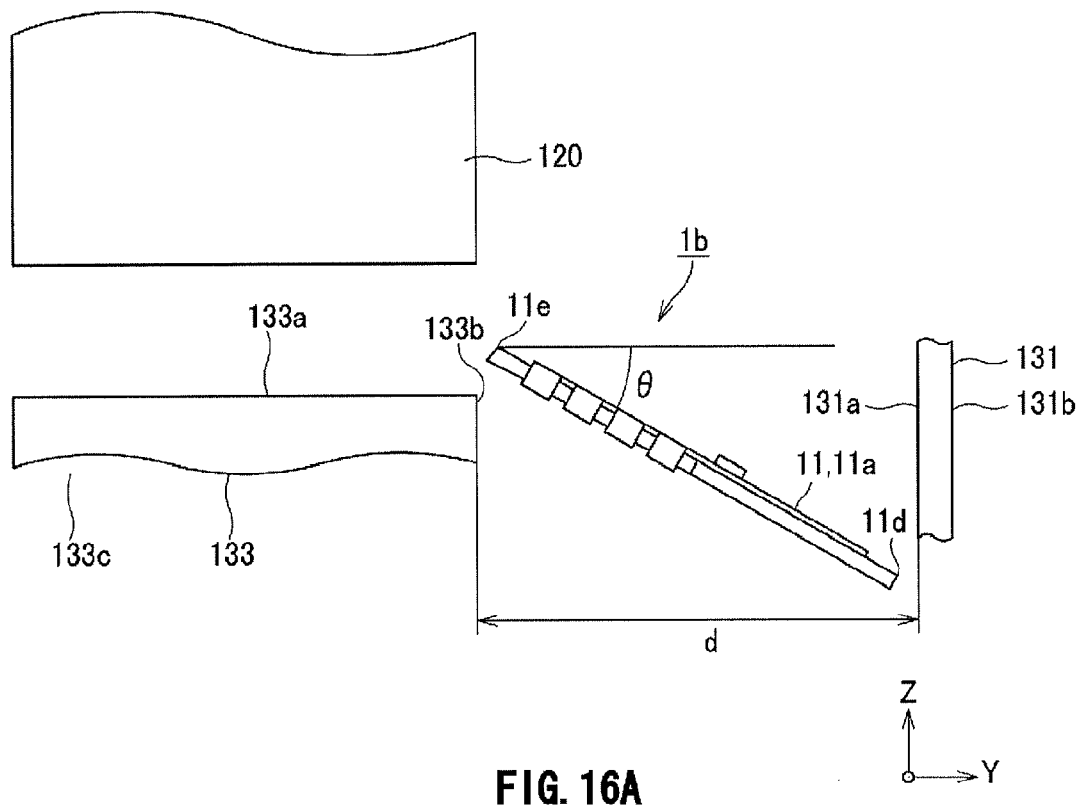
FIG. 16A and FIG. 16B are views for explaining changes in communication properties in accordance with dimensions of the antenna coil.
Figure 16B:
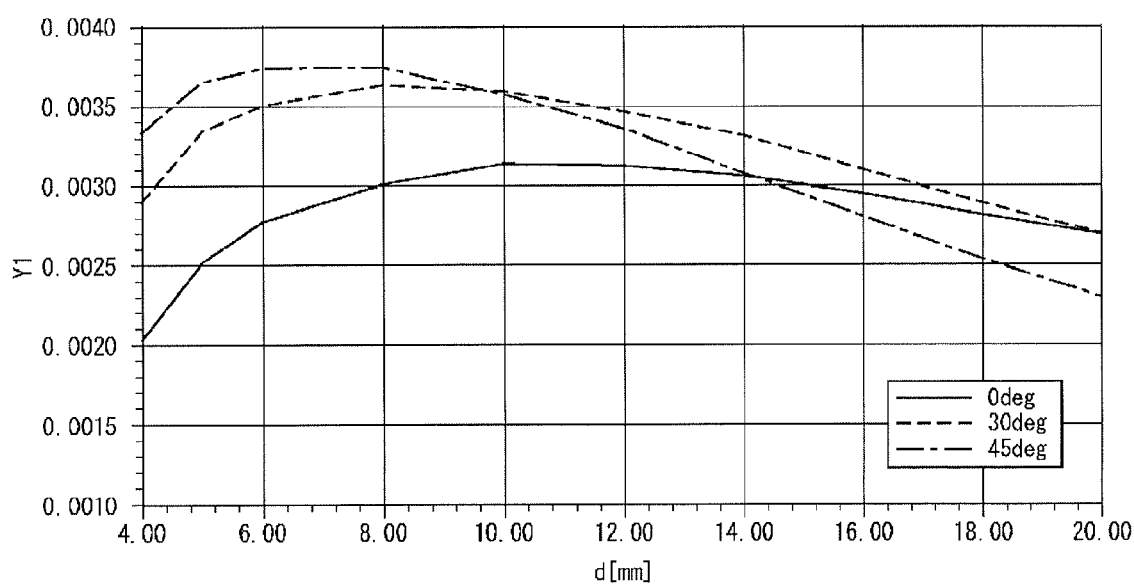

It is possible to realize favorable communication properties even if the width d [mm] is smaller than 8.00 mm. For instance, the antenna substrate 11 is disposed to be inclined with respect to surface xy opposing the reader/writer 120 with the end portion 11e on the metallic plate 133a side being the central axis as shown in FIG. 16A. At this time, the angles θ of inclining the antenna substrate 11 with respect to the surface xy opposing the reader/writer 120 are defined to be 0 degree, 30 degrees and 45 degrees while the width d [mm] of the clearance 132 defined in the y axial direction is changed, the coupling coefficients change as shown in FIG. 16B. In this respect, the shape of the antenna coil 11a is changed such that the end portions 11d, 11e coincide with the inner peripheral wall 131a of the casing 131 and the end portion 133b of the metallic plate 133a, respectively.

As it is apparent from FIG. 16B, under such conditions, the coupling coefficient is optimized when the value of d [mm] becomes smaller, which is, the clearance 132 becomes narrower in accordance with the increase in the inclination angle θ.

As it is apparent from this result, it is possible to realize favorable communication properties by inclining the antenna substrate 11 even if the width d [mm] is smaller than 8.00 mm.

As it is apparent from the above-described results of FIG. 15B and FIG. 16B, the antenna coil 11a realizes a relatively high coupling coefficient when the end portion 11e on the metallic plate 133a side is not more than approximately 14.00 mm in the y axial direction which is perpendicular to the inner peripheral wall 131a when using the inner peripheral wall 131a of the casing 131 as a reference and to realize favorable properties while realizing downsizing of space in Example 3. More favorably, the antenna coil 11a realizes a particularly high coupling coefficient when the end portion 11e on the metallic plate 133a side is not more than approximately 10.00 mm in the y axial direction which is perpendicular to the inner peripheral wall 131a when using the inner peripheral wall 131a of the casing 131 as a reference and to realize favorable properties while realizing downsizing of space.

When the size of the substrate surface of the antenna substrate 11 which is incorporated in the mobile phone 130 is limited, it is preferable a define a width for the antenna coil 11a in the x axial direction while satisfying a condition for the position of not more than approximately 14.00 mm in the y axial direction which is perpendicular to the inner peripheral wall 131a when using the inner peripheral wall 131a of the casing 131 as a reference and more preferably of not more than approximately 10.00 mm in view of the following evaluation results.

For efficiency evaluation, the antenna substrate 11 disposed proximate to the metallic plate 133a and the reader/writer 120 were opposed as shown in the above-described FIG. 7. The antenna 121 of the reader/writer 120 was a double-wound coil having an external form of 66 m×100 mm defined in xy axial directions. The metallic plate 133a was made of stainless steel having a dimension of 100 mm×50 mm×0.3 mm defined in xyz axial directions. The antenna coil 11a of the antenna module 1b was a fourfold-wound coil with external forms of 300 mm², 400 mm² and 500 mm² defined in xy axial directions in a condition in which the position of the end portion 11d on the inner peripheral wall 131a side of the antenna substrate 11 is substantially fixed at the position of the inner peripheral wall 131a of the casing 131. Moreover, the distance from the surface of the metallic plate 133a to the surface of the antenna coil 11a defined in the z axial direction was set to be 1 mm. It should be noted that the angle θ of inclining the antenna substrate 11 with respect to the surface xy opposing the reader/writer 120 was defined to be 0 degree.

Changes in coupling coefficients when changing the ratio of the width in the x axial directional with respect to the width in the y axial direction of the antenna coil 11a (hereinafter referred to as "aspect ratio") under such conditions are shown in FIG. 17.

Figure 17A:
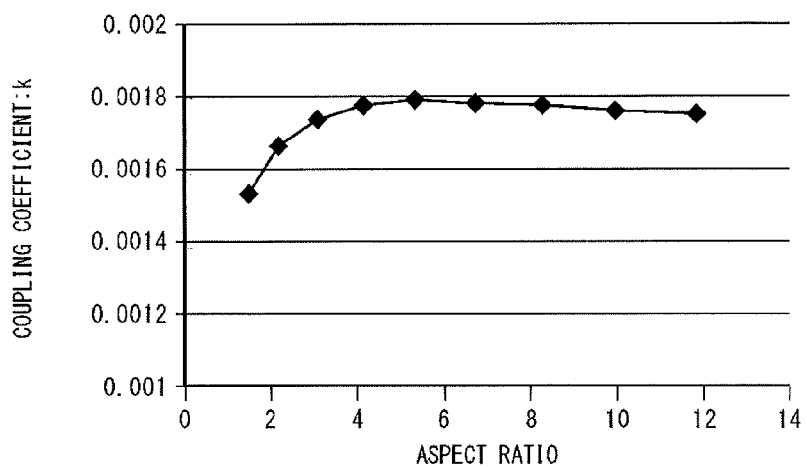
FIG. 17A, FIG. 17B and FIG. 17C are views showing changes in coupling coefficients when the ratio of a width in a y axial direction of the antenna coil to a width in an x axial direction of the antenna coil is changed.
Figure 17B:
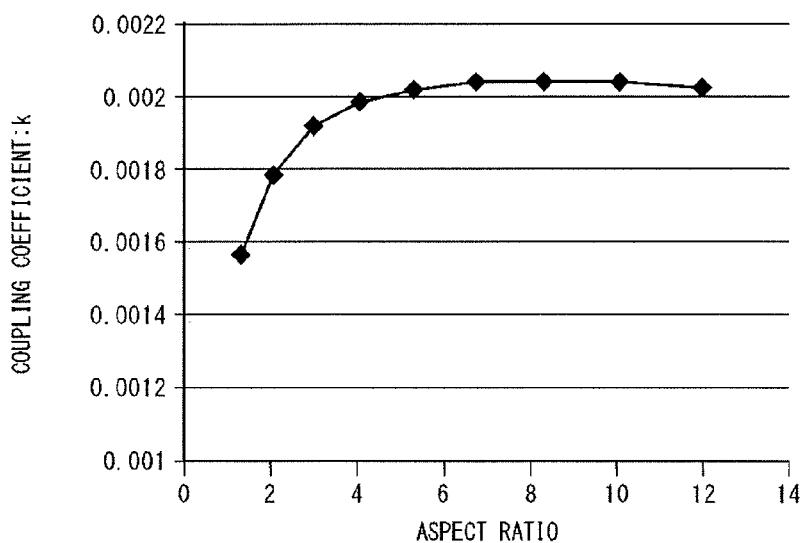
Figure 17C:
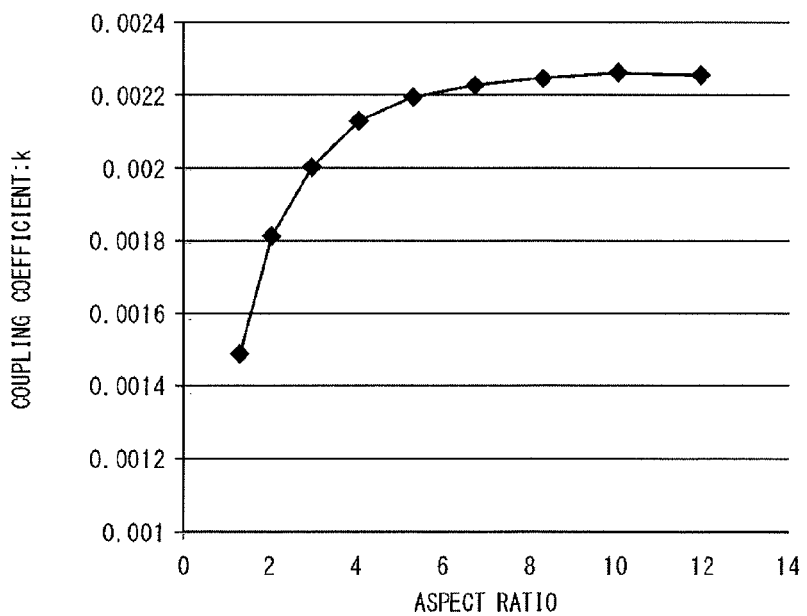

In FIG. 17A, the external form defined in the xy axial directions is defined to be 300 mm², in FIG. 17B, the external form defined in the xy axial directions is defined to be 400 mm² and in FIG. 17C, the external form defined in the xy axial directions is defined to be 500 mm².

In FIG. 17A, rise in coupling coefficients saturates when the aspect ratio becomes larger than 3, while in 17B, the rise in coupling coefficients saturates when the aspect ratio becomes larger than 4, and in FIG. 17C, the rise in coupling coefficients saturates when the aspect ratio becomes larger than 5. In other words, this shows that the rise in coupling coefficients saturates even if the width of the antenna coil 11a in the y axial direction is made to be wider than approximately 10.00 mm.

As it is apparent also from this result, the antenna coil 11a can realize favorable properties while realizing downsizing in space when the end portion 11e of the metallic plate 133a is disposed at a position at which it is not more than approximately 14.00 mm in the y axial direction which is perpendicular to the inner peripheral wall 131a when the inner peripheral wall 131a of the casing 131 is used as a reference and more favorably of not more than approximately 10.00 mm. In this manner, in order to expand the area of the antenna coil 11a which is defined in xy axial directions with the aim of achieving improvements in communication properties, it is preferable that the width in the x axial direction is expanded while satisfying a condition in which the end portion 11e on the metallic plate 133a side is at a position which is not more than approximately 10.00 mm in the y axial direction which is perpendicular to the inner peripheral wall 131a when the inner peripheral wall 131a of the casing 131 is used as a reference.

Moreover, when the width of the clearance 132 in the y axial direction is limited to be not more than 8.00 mm, favorable communication properties can be realized by increasing the inclination angle θ of the antenna substrate 11 in accordance with the narrowness of the width.

In this manner, according to the antenna coil 11a of Example 3, it is possible to particularly improve properties per unit areas so as to realize an antenna module of small size, with little restrictions for mounting and of high competiveness.

REFERENCE SIGNS LIST

1 . . . communication apparatus; 1a, 1b, 1c, 1d . . . antenna module; 11 . . . antenna substrate; 11a . . . antenna coil; 11b . . . terminal portion; 11c . . . central portion; 11d, 11e, 13a, 113b, 133b, 234a . . . end portion; 111 . . . central axis; 12 . . . communication processing portion; 13,134, 234 . . . magnetic sheet; 100 . . . radio communication system; 120 . . . reader/writer; 121 . . . antenna; 122 . . . control board; 130, 230 . . . mobile phone; 131 . . . casing; 131a . . . inner peripheral wall; 131b . . . outer peripheral wall; 132 . . . clearance; 133 . . . battery pack; 133a . . . metallic plate; 133c . . . central portion

The invention claimed is:

1. An antenna apparatus which is incorporated in an electronic device and which is enabled to perform communication by receiving a magnetic field transmitted from a transmitter comprising:

an antenna coil which is wound in a clearance between an end portion of a conductive body opposing the transmitter within a casing of the electronic device and an inner peripheral wall of the casing so as not to surround an outer peripheral portion of the conductive body and which is inductively coupled with the transmitter;

wherein the antenna coil is disposed upon being inclined with respect to a surface opposing the transmitter with an end portion on the conductive body side being a central axis.

2. The antenna apparatus according to claim 1, further comprising a magnetic sheet for drawing a magnetic field transmitted from the transmitter into the antenna coil,
wherein the antenna coil is formed by using a signal wire on a printed circuit board,
wherein the antenna coil and the magnetic sheet are superposed with respect to each other so as to satisfy both conditions of arrangement, namely a condition of disposing the magnetic sheet to be located further to the transmitter side than the antenna coil on a central side of a casing surface opposing the transmitter and a condition of disposing the antenna coil to be located further on the transmitter side than the magnetic sheet on the outer peripheral side of the casing surface with the magnetic sheet being inserted into a central portion of the antenna coil formed on the printed circuit board.

3. The antenna apparatus according to claim 1, wherein the transmitter transmits a magnetic field having a transmission frequency of 13.56 MHz, and
wherein the antenna coil is disposed such that the end portion of the antenna coil on the conductive body side is at a position which is not more than approximately 14.00 mm in a perpendicular direction with respect to an inner peripheral portion when the inner peripheral portion of the casing is used as a reference.

4. The antenna apparatus according to claim 3, wherein the antenna coil is disposed such that the end portion of the antenna coil on the conductive body side is at a position which is not more than approximately 10.00 mm in a perpendicular direction with respect to an inner peripheral portion when the inner peripheral portion of the casing is used as a reference.

5. A communication apparatus which is enabled to perform communication by receiving a magnetic field transmitted from a transmitter, comprising:
an antenna coil which is wound in a clearance between an end portion of a conductive body opposing the transmitter within a casing of the electronic device and an inner peripheral wall of the casing so as not to surround an outer peripheral portion of the conductive body and which is inductively coupled with the transmitters;
a communication processing portion which is driven through current flowing through the antenna coil for performing communication with the transmitter; and
a second magnetic sheet that covers a surface of the conductive body opposing the transmitter,
wherein the second magnetic sheet extends towards the antenna coil side such that an end portion on the antenna coil side does not superpose a surface of the antenna coil opposing the transmitter.

6. The communication apparatus according to claim 5, further comprising:
a first magnetic sheet for drawing a magnetic field transmitted from the transmitter into the antenna coil.

7. The communication apparatus according to claim 6, wherein the second magnetic sheet extends towards the antenna coil side such that a position of the end portion on the antenna coil side substantially coincides a position of an end portion of the first magnetic sheet on the conductive body side.

8. The communication apparatus according to claim 5, wherein the transmitter transmits a magnetic field having a transmission frequency of 13.56MHz, and
wherein the antenna coil is disposed such that the end portion of the antenna coil on the conductive body side is at a position which is not more than approximately 14.00 mm in a perpendicular direction with respect to an inner peripheral portion when the inner peripheral portion of the casing is used as a reference.

9. The communication apparatus according to claim 8, wherein the antenna coil is disposed such that the end portion of the antenna coil on the conductive body side is at a position which is not more than approximately 10.00 mm in a perpendicular direction with respect to an inner peripheral portion when the inner peripheral portion of the casing is used as a reference.

10. A communication apparatus which is enabled to perform communication by receiving a magnetic field transmitted from a transmitter, comprising:
a power supply portion;
an antenna coil which is wound in a clearance between an end portion of a conductive body opposing the transmitter within a casing of an electronic device and an inner peripheral wall of the casing so as not to surround an outer peripheral portion of the conductive body and which is inductively coupled with the transmitter;
a communication processing portion which is driven through power which is supplied from a battery for performing communication with the transmitter; and
a second magnetic sheet that covers a surface of the conductive body opposing the transmitter,
wherein the second magnetic sheet extends towards the antenna coil side such that an end portion on the antenna coil side does not superpose a surface of the antenna coil opposing the transmitter.

* * * * *